United States Patent
Caritu et al.

(10) Patent No.: US 9,170,268 B2
(45) Date of Patent: Oct. 27, 2015

(54) SYSTEM AND METHOD FOR COUNTING THE CHANGES IN DIRECTION OF A PERSON

(75) Inventors: Yanis Caritu, St Joseph la Riviere (FR); Bruno Flament, Saint Julien de Ratz (FR); Christelle Godin, Brignoud (FR)

(73) Assignees: MOVEA, Grenoble (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 749 days.

(21) Appl. No.: 13/504,110

(22) PCT Filed: Oct. 26, 2010

(86) PCT No.: PCT/EP2010/066099
§ 371 (c)(1),
(2), (4) Date: Jul. 20, 2012

(87) PCT Pub. No.: WO2011/051245
PCT Pub. Date: May 5, 2011

(65) Prior Publication Data
US 2012/0283856 A1    Nov. 8, 2012

(30) Foreign Application Priority Data

Oct. 26, 2009   (FR) ...................................... 0957502

(51) Int. Cl.
| | |
|---|---|
| G06F 19/00 | (2011.01) |
| G01P 13/02 | (2006.01) |
| G01C 22/02 | (2006.01) |
| A63B 24/00 | (2006.01) |

(52) U.S. Cl.
CPC ................ *G01P 13/02* (2013.01); *G01C 22/02* (2013.01); *A63B 24/0062* (2013.01); *A63B 2220/16* (2013.01); *A63B 2244/20* (2013.01)

(58) Field of Classification Search
CPC .................. B60R 21/01536; B60R 21/01516; G07C 5/008
USPC ................................... 702/150–160, 182–185
See application file for complete search history.

(56) References Cited

U.S. PATENT DOCUMENTS

| | | | |
|---|---|---|---|
| 6,543,146 | B2 | 4/2003 | Smith et al. |
| 2006/0098772 | A1 | 5/2006 | Reho et al. |
| 2007/0293374 | A1 | 12/2007 | Chan |
| 2008/0249740 | A1* | 10/2008 | Verhaert ....................... 702/160 |

FOREIGN PATENT DOCUMENTS

JP         2002-196055 A      7/2002

OTHER PUBLICATIONS

International Search Report and Written Opinion dated Jul. 14, 2011 issued in counterpart International Application No. PCT/EP2010/066099.

* cited by examiner

*Primary Examiner* — Edward Raymond
(74) *Attorney, Agent, or Firm* — Stroock & Stroock & Lavan LLP

(57) ABSTRACT

A system for counting a basic displacement of a person includes a housing (BT) and a fixing device (EF) for securely mounting the housing (BT) on the person. Within the housing are a magnetometer for measuring the direction of the terrestrial magnetic field in the reference frame of the housing, a device for determining a quantity representative of the inclination of the measured magnetic field with respect to the vertical, and a device for detecting a change of orientation of an orthogonal projection of the direction of the terrestrial magnetic field in a horizontal planar reference frame having axes of constant directions and tied in translation to the person, on the basis of the measured direction of the magnetic field and of the quantity representative of the inclination of the magnetic field with respect to the vertical.

26 Claims, 19 Drawing Sheets

SYSTEM AND METHOD FOR COUNTING THE CHANGES IN DIRECTION OF A PERSON

The invention pertains to a system for counting changes of direction of a person, and particularly of outward-return journeys or turnarounds of a swimmer in a pool.

Systems exist for counting changes of direction of a person, for example as described in patent application WO2004/038336 which describes a system comprising a magnetometer. The changes of direction of a person are detected when the measurements of the magnetometer change value. However, a magnetometer alone does not allow the elimination of spurious movements other than changes of direction in the horizontal plane. This system uses only the data arising from the magnetometer, which data may be disturbed. Consequently, it is of limited reliability.

Within the framework of swimming, numerous swimmers wish to be able to precisely evaluate the distance that they have traversed during a swimming session. The fact of having to count the number of lengths or of outward-return journeys traversed is irksome, comprises a non-negligible risk of error, and for a swimmer of good level, can disturb him and limit his performance.

Systems exist which make it possible to automatically count the lengths swum, for example as described in American patent application US 200710293374A1. This application describes a counter of pool outward-return journeys in a housing attached to the swimmer by fixing means comprising a compass sensor providing a signal which changes as a function of an outward direction or of a return direction of the swimmer in the pool. This counter of outward-return journeys for a swimmer, comprises a housing, means for fixing the housing on the swimmer, a compass sensor internal to the housing for providing an output signal which changes as a function of the outward or return direction of the swimmer in the pool, and a processor programmed to distinguish in the output signal of the compass sensor a change of direction of the swimmer so as to count the number of outward-return journeys of the latter. This counter is also capable of counting the swimming movements of the swimmer using the counter.

Such a counter is of limited precision.

The aim of the present invention is to propose a system for counting changes of direction of a person, and notably for counting outward-return journeys of a swimmer in a pool, having improved detection reliability.

According to one embodiment of the invention, there is proposed a system for counting changes of direction of a person, comprising a housing and fixing means for securely tying said housing to a part of the body of said person, the system comprising:

means for measuring the direction of the terrestrial magnetic field in the reference frame of the housing;
means for determining a quantity representative of the inclination of the measured magnetic field with respect to the vertical; and
first means for detecting a change of orientation of an orthogonal projection of said direction of the terrestrial magnetic field in a horizontal planar reference frame having axes of constant directions and tied in translation to said person, on the basis of said measured direction of the magnetic field and of said quantity representative of the inclination of the magnetic field with respect to the vertical.

It is thus possible, with improved detection reliability, to count the changes of direction of a person. Indeed, a system according to the invention makes it possible to greatly limit omissions of detection of change of direction or false detections of change of direction.

Such a system makes it possible to detect a change of orientation of an orthogonal projection of the direction of the terrestrial magnetic field in a horizontal planar reference frame having axes of constant directions and tied in translation to the person, without calculating any orthogonal projection, but solely by detecting a change of orientation thereof.

Orthogonal projection of the direction of the terrestrial magnetic field in said horizontal plane is intended to connote the component in said horizontal plane of the measured magnetic field. Hence, the present invention makes it possible to detect a change of orientation of this component, without calculating the value of the latter.

For example, said means for measuring the direction of the terrestrial magnetic field in the reference frame of the housing comprise a calibrated triaxial magnetometer able to provide measurements of the terrestrial magnetic field at a given location.

The calibration consists in transforming the electrical measurements of the three axes into a vector with three components whose direction is that of the measured field and the norm of which is proportional to the intensity of the measured field by using the following expression A(M-O) in which O is a three-dimensional vector (shift of the three axes), A is a square matrix of dimension three, taking into account the sensitivity of the three axes as well as their possible non-orthogonality.

In one embodiment, said first detection means comprise first means for computing a signal representative of said change of orientation with respect to a reference orientation corresponding to a reference instant.

The signal useful for counting the changes of direction is thus extracted from the measured physical quantities. Simultaneously, the changes of orientation which do not carry any heading information, such as the rotation movements with horizontal axis of the segment of the body carrying the housing, are excluded or canceled.

For example, said reference instant may be fixed and said first detection means adapted for detecting a change of orientation of said projection when said representative signal changes relative position with respect to a threshold.

As a variant, said reference instant may be relative, on the basis of the present instant shifted into the past by a constant duration, and said first detection means are adapted for detecting a change of orientation of said projection when said representative signal exhibits a spike above or below a threshold.

According to one embodiment, said determination means are adapted for determining said quantity representative of the inclination on the basis of at least one stored value of said inclination.

For this embodiment, cartographic data for the world are used, in particular a list of inclination values for the terrestrial magnetic field in the various parts of the globe. This list may be stored in the system of the invention, and an algorithm makes it possible to recover the stored value of this inclination at a precise location. In another variant, the person knowing the location at which he is situated, and the value of the inclination of the magnetic field at this location, inputs this value into a memory of the system of the invention.

It is thus possible, when the inclination of the magnetic field with respect to the vertical is known fairly precisely, to limit the calculations and avoid using an accelerometer, thereby limiting the cost of production. This value for example is available at a given geographical point, for example, in France the inclination with respect to the vertical is 30°.

In one embodiment, said determination means are adapted for determining said quantity representative of the inclination on the basis of at least one measurement performed with the magnetometer oriented along a known direction, for example the vertical or the horizontal.

The cost of production is thereby limited, since no accelerometer is used. It is furthermore unnecessary for there to be stored information relating to the magnetic field at the place where the counting is carried out. The value of the quantity representative of the inclination may be given by a measurement performed with the magnetometer oriented along a known direction. For example, if an axis of the magnetometer is oriented along the vertical and the value of the magnetic field is measured on this axis, this measurement is equal to the cosine of the inclination (it is therefore a quantity representative of the inclination).

According to one embodiment, said determination means comprise, furthermore, a calibrated accelerometer with three measurement axes, furnished with fixing means adapted for keeping said triaxial accelerometer in a substantially constant relative orientation with respect to said magnetometer, and are adapted for determining said quantity representative of the inclination on the basis of the measurements of said accelerometer.

The accelerometer affords the possibility of improved precision.

According to one embodiment, said first computation means comprise first means for estimating the vector product of the vector of the measurement signals transmitted by the accelerometer and of the vector of the measurement signals transmitted by the magnetometer, and are adapted for detecting a change of sign of said vector product.

This is a simple way of detecting a change of heading.

For example, said first computation means comprise first means for calculating the sum of the squares of the components of the sum of said vector product and of a reference vector product estimated by said first estimation means at a reference instant, and said first detection means are adapted for detecting a change of orientation of said projection on the basis of said sum calculated by said first calculation means and of said first threshold, said vector products being normalized.

The first estimation means make it possible to strengthen the signal of the movements in the horizontal plane. The first calculation means make it possible to amplify the changes of direction.

Said first threshold can then equal $4-\alpha_1$, $\alpha_1$ depending on the desired detection precision, $\alpha_1$ possibly being, for example, equal to 0.5 to detect arbitrary changes of direction, or 2 to detect about-turns or changes of direction of 180°.

As a variant, said first computation means comprise second means for calculating an angular portion separating said vector product and a reference vector product estimated by said first estimation means at a reference instant, and said first detection means are adapted for detecting a change of orientation of said projection on the basis of said angular portion calculated by said second calculation means and of a second threshold.

The second calculation means make it possible to obtain an angular portion representative of the change of direction. Thus, the threshold is easy to adjust as a function of the changes of direction that it is desired to detect.

Said second threshold can then equal, for example, 30° if it is desired to detect changes of direction of greater than 30°, or 90° if it is desired to detect about-turns.

It is then easy to adjust the sensitivity of the system.

As a variant, said first computation means comprise third means for calculating a scalar product of said vector product and of a reference vector product estimated by said estimation means at a reference instant, and said first detection means are adapted for detecting a change of orientation of said projection on the basis of said scalar product calculated by said third calculation means and of a third threshold, said vector products being normalized.

Thus slight changes of orientation are discarded.

Said third threshold can then equal $1-\alpha_3$, when said vector products are normalized, $\alpha_3$ depending on the desired detection precision, $\alpha_3$ possibly being, for example, equal to 0.1 if it is desired to detect small changes of direction, or 1 if it is desired to detect about-turns.

It is thus easy to adjust the sensitivity of the system.

In one embodiment, said first computation means comprise second means for estimating the quantity representative of the inclination of said magnetometer with respect to said horizontal plane on the basis of the measurements of the accelerometer, and fourth means for calculating a magnetic field compensated by applying to the measurements of the magnetic field, in the reference frame of the housing, the rotation inverse to that performed by the magnetometer.

Thus, in this embodiment, the precision is improved.

In one embodiment, said second estimation means comprise fifth means for calculating the North-East-Down geographical reference frame at said reference instant in the reference frame of said magnetometer, sixth means for calculating a matrix for switching from the reference frame of the magnetometer to the North-East-Down reference frame, and seventh means for calculating the angles of pitch and of roll of said magnetometer with respect to the reference frame of the magnetometer at the reference instant.

Thus, it is possible to refer the measurements to a reference frame which is known at the reference instant and to observe the evolution of the measurements in this reference frame. The measurements in this reference frame are called compensated measurements.

For example, said second estimation means comprise eighth means for calculating the sum of the squares of the components of the sum of said vector of the compensated measurements of the magnetometer and of a reference vector of the compensated measurements of the magnetometer at a reference instant, and said first detection means are adapted for detecting a change of orientation of said projection on the basis of said sum calculated by said eighth calculation means and of said first threshold, said vectors being normalized.

The characteristics of the changes of direction are thus amplified.

Said first threshold can then equal $4-\alpha_1$, $\alpha_1$ depending on the desired detection precision, $\alpha_1$ possibly being, for example, equal to 0.5 to detect arbitrary changes of direction, or 2 to detect about-turns or changes of direction of 180°.

As a variant, said first computation means can comprise ninth means for calculating the angular portion separating a vector of the compensated measurements of the magnetometer and a reference vector of the compensated measurements of the magnetometer at a reference instant, and said first detection means may be adapted for detecting a change of orientation of said projection on the basis of said angular portion calculated by said ninth calculation means and of a second threshold.

It is thus easy to adjust the sensitivity of the system.

Said second threshold can then equal, for example, 30° if it is desired to detect changes of direction of greater than 30°, or 90° if it is desired to detect about-turns.

As a variant, said first computation means can comprise tenth means for calculating a scalar product of a vector of the compensated measurements of the magnetometer and of a reference vector of the compensated measurements of the magnetometer at a reference instant, and said first detection means may be adapted for detecting a change of orientation of said projection on the basis of said scalar product calculated by said tenth calculation means and of a third threshold, said vectors being normalized.

Thus slight changes of orientation are discarded.

The third threshold can then equal $1-\alpha_3$, when said vector products are normalized, $\alpha_3$ depending on the desired detection precision, $\alpha_3$ possibly being, for example, equal to 0.1 if it is desired to detect small changes of direction, or 1 if it is desired to detect about-turns.

In one embodiment, said first computation means comprise third means for estimating the angle of yaw of said magnetometer with respect to said horizontal plane, on the basis of the measurements of the accelerometer and of the magnetometer.

The angle of the rotation sought is thus calculated directly.

According to one embodiment, said first computation means comprise eleventh means for calculating a scalar product of the vector of the measurement signals transmitted by the magnetometer and of the vector of the measurement signals transmitted by the magnetometer at said reference instant, and said first detection means are adapted for detecting a change of orientation of said projection on the basis of said scalar product calculated by said eleventh calculation means and of a fourth threshold, said vectors being normalized.

Thus the cost of the system is reduced, since the latter is devoid of accelerometer.

The fourth threshold can then equal $1-\alpha_4$, $\alpha_4$ possibly being, for example, equal to 0.1 so as to detect an arbitrary change of direction, or 0.25 so as to detect an about-turn, in the case where the inclination of the magnetic field is 60° as in France.

According to one embodiment, the system may be adapted for counting the number of changes of direction of a swimmer in a pool, in which said housing is leaktight, and in which said change of orientation corresponds to a change of direction of crossing of the pool.

Such a system is particularly practical for a swimmer who wishes to monitor his training and his progress.

According to one embodiment, the system comprises an accelerometer with three measurement axes, furnished with fixing means adapted for keeping said triaxial accelerometer in a relative orientation with respect to said magnetometer, and second means for detecting a change of sign of the acceleration vector measured by said accelerometer representative of a change between a frontstroke and a backstroke of the swimmer.

Thus, in the case of the swimmer it is possible to detect a switch from a backstroke to a frontstroke, and vice versa.

In one embodiment, said second detection means comprise twelfth means for calculating the sum of the squares of the components of the sum of an acceleration vector measured by said accelerometer and of a reference acceleration vector measured by said accelerometer at a reference instant, and said second detection means are adapted for detecting a change between a frontstroke and a backstroke of the swimmer on the basis of said sum calculated by said twelfth calculation means and of a fifth threshold, said vectors being normalized.

In the case of change of type of front/backstroke, the risk of non-detection of an about-turn corresponding also to a turn-around at the end of a length of the pool is limited.

Said fifth threshold can then equal 2 or 3.

When the fifth threshold is chosen equal to 3, the detection sensitivity of the system is higher than when the threshold is chosen equal to 2.

As a variant, said second detection means comprise thirteenth means for calculating an angular portion separating said acceleration vector measured by said accelerometer and a reference acceleration vector measured by said accelerometer at a reference instant, and said second detection means are adapted for detecting a change between a frontstroke and a backstroke of the swimmer on the basis of said angular portion calculated by said thirteenth calculation means and of a sixth threshold.

It is thus possible to have available an angular indication relating to the turnaround of the swimmer.

Said sixth threshold can then equal 60° or 90°.

When the threshold is chosen equal to 60°, the detection sensitivity of the system is higher than when the threshold is chosen equal to 90°.

Thus only changes of orientation of the accelerometer are detected so as to isolate the changes of front/back position of the swimmer.

As a variant, said second detection means comprise fourteenth means for calculating a scalar product of said acceleration vector measured by said accelerometer and of a reference acceleration vector measured by said accelerometer at a reference instant, and said second detection means are adapted for detecting a change between a frontstroke and a backstroke of the swimmer on the basis of said scalar product calculated by said fourteenth calculation means and of a seventh threshold, said vectors being normalized.

Thus, changes of orientation of the accelerometer of low values are discarded.

Said seventh threshold can then equal 0 or 0.5.

When the seventh threshold is chosen equal to 0.5, the detection sensitivity of the system is higher than when the threshold is chosen equal to 0.

In one embodiment, said second detection means are adapted for updating a fixed reference instant at the moment of detection of a change between a frontstroke and a backstroke of the swimmer.

The signal is thus more stable over time and changes of direction or front/back turnovers are easier to detect.

According to one embodiment, the system comprises third means for detecting a change between a frontstroke and a backstroke of the swimmer when said scalar product calculated by said eleventh calculation means switches from a positive value to a negative value.

It is thus possible to avoid the use of an accelerometer, thereby limiting the cost of the system.

In one embodiment, the system comprises, furthermore, low-pass or average-based means of filtering over a sliding window.

After such filtering, the signal may be sub-sampled, thereby limiting the cost in terms of calculation.

According to another aspect of the invention, there is also proposed a method of counting changes of direction of a person, characterized in that it comprises the steps consisting in:

measuring the direction of the terrestrial magnetic field in the reference frame of a housing (BT) tied securely to a part of the body of said person;

determining a quantity representative of the inclination of the measured magnetic field with respect to the vertical; and detecting a change of orientation of an orthogonal projection of said direction of the terrestrial magnetic field in a horizontal planar reference frame having axes of constant directions and tied in translation to said person, on the basis of said measured direction of the magnetic field and of said quantity representative of the inclination of the magnetic field with respect to the vertical.

The invention will be better understood on studying a few embodiments described by way of wholly non-limiting examples and illustrated by the appended drawings in which:

FIGS. 1 to 7, and 9 to 12 schematically illustrate embodiments of a system, according to diverse aspects of the invention, comprising a triaxial accelerometer;

FIG. 8 schematically illustrates an embodiment of a system, according to one aspect of the invention, devoid of triaxial accelerometer;

FIGS. 13a, 13b, 13c, 13d, 13e, 13f and 13g illustrate a first exemplary manner of operation of a system according to FIG. 1 adapted to swimming, without changes between a frontstroke and a backstroke of the swimmer; and FIGS. 14a, 14b, 14c, 14d, 14e, and 14f illustrate a second exemplary manner of operation of the system of FIG. 11, adapted to swimming, with changes between a frontstroke and a backstroke of the swimmer.

In all figures, elements having the same references are similar.

In the subsequent description, to further facilitate the understanding of the invention, the latter is described in conjunction with swimming, with a system for counting the number of outward/return journeys of a swimmer in a pool. But it has other applications, such as a person racing on foot on a track, bike riding on a track, etc.

Such as illustrated in FIG. 1, the system for counting changes of direction of a person comprises a housing BT furnished with a calibrated magnetometer 3M with three measurement axes. The housing BT is adapted for being fixed to a part of the body of said person, in this instance by means of a fixing elastic EF. As a variant, any other fixing means may suit.

Display means AFF, for example tied to the housing can make it possible to display the results. The display means AFF can also be in conjunction or replaced with means of audio indication for an audio headset.

The system comprises a module DET_INC for determining a quantity representative of the inclination of the measured magnetic field with respect to the vertical, and a first module DETEC1 for detecting a change of orientation of an orthogonal projection of at least one axis of measurement of said magnetometer in a horizontal planar reference frame having axes of constant directions and tied in translation to said person. Stated otherwise, only the horizontal component of the magnetic field measured in the reference frame of the sensor is of interest. This component is given by decomposing the field measured in the reference frame of the sensor into two parts: the horizontal component and the vertical component.

It is considered, however, that the change of the vertical component is not related to the change of direction of the person in the horizontal plane, but rather to stroke-specific head movements for example (except in the case of a change of direction related to switching from a backstroke to a frontstroke and vice versa: this particular case is treated later). Therefore (except in the particular case of front/back or back/frontstroke change), only the horizontal component is utilized to detect the change of direction of the person, and the signals representative of the spurious movements are thus eliminated so as to concentrate on the "useful" signals.

The first detection module DETEC1 makes it possible to detect a change of orientation of the horizontal component of the measured magnetic field, without making it necessary to determine the value of this component.

The magnetometer 3M and an optional accelerometer 3A are previously calibrated to have measurements of the magnetometer 3M and of the accelerometer 3A that are proportional to the physical fields. Also, in the present description, the inherent acceleration of the accelerometer 3A and the magnetic disturbances are considered to be zero. The measurement axes of the magnetometer 3M and of the optional accelerometer 3A are generally collinear pairwise, and for each of these sensors the three measurement axes are pairwise orthogonal. If this is not the case, an additional step of geometric calibration makes it possible to perform the transformation necessary to obtain these conditions so as to align the reference frame of the accelerometer with the reference frame of the magnetometer.

The first detection module DETEC1 comprises a first module ELAB1 for computing a signal representative of said change of orientation with respect to a reference orientation corresponding to a reference instant $t_{ref}$.

The reference instant $t_{ref}$ may be fixed (for example, the initial instant t0 taken at the start of the swimming activity), and the first detection means DETEC1 adapted for detecting a change of orientation of the projection when the representative signal changes relative position with respect to a threshold.

For example, it is considered that for $t_{ref}$=t0, we have a square signal representative of the measurements which pass either side of the threshold. It is possible, for example, to say that if this signal is above this threshold for a sufficiently long time, we have the outward journey on a traversal (or return journey) and if the signal is below this threshold for a sufficiently long time, we have the return journey (or the outward journey).

Therefore, the aberrant points are eliminated, that is to say, the points which are not significant over a length, and the lengths are thereafter counted.

As a variant, the reference instant $t_{ref}$ may be relative, on the basis of the present instant t shifted into the past by a constant duration T (time shift).

For example, T may be less than a minimum duration of a pool length and greater than the duration of turnaround of the swimmer (for example, for a 25 m pool, 1 s<T<10 s).

The first detection means DETEC1 are adapted for detecting a change of orientation of the projection when the representative signal exhibits a spike with respect to a threshold. Indeed, in the case where the reference instant $t_{ref}$ is relative, the measurement signal is a signal exhibiting spikes corresponding to the turnarounds. These spikes are detected if they are above (or below) the threshold, i.e. if they change relative position with respect to the threshold, in this way, the components below this threshold and which may correspond to noise or erroneous measurements are eliminated.

The determination of a threshold may be performed as follows. A search is firstly conducted for what is the value of the representative quantity when t and $t_{ref}$ are in the same direction and what is this value when they are in opposite directions. The threshold used is chosen between these two values.

The threshold relating to the reference instant may be any threshold (from the first threshold to the eighth threshold) presented subsequently.

The determination module DET_INC can comprise an optional calibrated accelerometer 3A with three measurement axes, furnished with a fixing element FIX adapted for keeping said triaxial accelerometer 3A in a substantially constant relative orientation with respect to the magnetometer 3M. The determination module DET_INC can determine said inclination on the basis of the measurements of the accelerometer 3A.

The first computation module ELAB1 comprises a first module EST1 for estimating the vector product V of the vector of the measurement signals A(t) transmitted by the accelerometer 3A and of the vector B(t) of the measurement signals transmitted by the magnetometer 3M, and can detect a change of sign of the vector product V. At any instant, the first estimation module EST1 effects the vector product V(t) of the measurement of the accelerometer 3A with that of the magnetometer 3M: $V(t)=A(t)\char`\^ B(t)$. The 3-dimensional signal V represents the coordinates of the horizontal EAST in the reference frame of the magnetometer 3M. Thus, at each turn-around in the horizontal plane it is necessary to observe the switch from V to −V. The vectors V can, as a variant, be normalized by dividing V by its norm V/∥V∥.

To observe the switch from V to −V, the first computation module ELAB1 furthermore comprises a first module CALC1 for calculating the sum of the squares of the components of the sum of the vector product V(t) and of a reference vector product $V(t_{ref})$ estimated by the estimation module at the reference instant $t_{ref}$: $(V_x(t)+V_x(t_{ref}))^2+(V_y(t)+V_y(t_{ref}))^2+(V_z(t)+V_z(t_{ref}))^2$ $V_x$, $V_y$ and $V_z$ representing the components along the three axes of the reference frame of the magnetometer 3M. The vector products are normalized.

The first detection module DETEC1 makes it possible to detect a change of orientation of the projection, corresponding to a change of heading of the person, on the basis of said sum calculated by said first calculation means CALC1 and of a first threshold, as explained previously, depending on whether the reference instant $t_{ref}$ is fixed or relative, respectively when the representative signal changes relative position with respect to a first threshold or when said representative signal exhibits a spike above or below a first threshold.

This first threshold can equal $4-\alpha_1$, $\alpha_1$ possibly being, for example, equal to 0.5 to detect arbitrary changes of direction, or 2 to detect about-turns or changes of direction of 180°. Indeed, for a system adapted for counting about-turns and more particularly those of a swimmer, the first threshold may be fixed at 2 since the sum calculated by the first calculation module CALC1 must be close to 0 when there has been a change of length and to 4 when on the same length.

An optional filtering module FILT, of low-pass type or based on average over a sliding window makes it possible to be able to sub-sample the signal to be processed, and to thus limit the number of calculations to be performed, as well as to eliminate spurious movements in the horizontal plane as well as to minimize the effect of magnetic disturbances and inherent accelerations. This filtering module FILT also makes it possible to eliminate rotation movements which do not correspond to changes of direction such as rotations of the location where the sensor is fixed during a stride in respect of a runner or a walker, a swimming movement in respect of a swimmer, a pedal revolution in respect of a cyclist, an oar revolution in respect of a rower etc. These movements being of higher frequency than the signal to be observed (changes of direction), low-pass or average-based filtering over a sliding window is particularly well adapted.

In the case of a system adapted to a swimmer, this filtering makes it possible to minimize the variations due to periodic movements, for example of the swimmer's head when the system is fixed to the swimmer's head, for example on his swimming goggles. This filtering furthermore minimizes the effect of the inherent accelerations and magnetic disturbances.

When the filtering module FILT implements a low-pass filtering, analog or digital, the cutoff frequency is below the frequency of the head movements and above the frequency of change of length. When the filtering module FILT implements a filtering by sliding average, the width of the sliding window is greater than the duration of a head movement and less than the duration of a pool length. The calculations are simplified if the filtering is performed after the digitization of the signal.

For a pool 25 m in length, the cutoff frequency of the filter may be 0.12 Hz in the case of the low-pass filtering, and the width of the sliding window may be 8 s in the case of the sliding-average filtering. In the case of low-pass filtering, the cutoff frequency of the filter FILT must always be greater than that of the outward-return journeys. In so far as possible, it must be less than that of the movements other than those of the turnarounds. In general this is possible since the outward-return journeys take place over a large time scale and the other movements, periodic or otherwise, are faster.

In the case of the runner with a sensor on his foot for example, the filtering module FILT makes it possible to filter the strides.

FIG. 2 schematically represents a variant of the system of FIG. 1, in which in place of the first calculation module CALC1, a second calculation module CALC2 for calculating an angular portion separating the vector product V(t) and a reference vector product $V(t_{ref})$ estimated by the first estimation module EST1 at a reference instant $t_{ref}$. The first detection module DETEC1 is adapted for detecting a change of orientation of said projection on the basis of the angular portion calculated by the second calculation module CALC2 and of a second threshold.

The second threshold can then, for example, equal 30° if it is desired to detect changes of direction of greater than 30°, and 90° if it is desired to count about-turns, notably in the case of a system adapted to a swimmer, in which case the angle must be 180° when there has been a change of length and 0° when on the same length.

FIG. 3 schematically represents a variant of the system of FIG. 1 or of the system of FIG. 2, in which in place of the first calculation module CALC1 or of the second calculation module CALC2, the system comprises a third calculation module CALC3 for calculating the scalar product of the vector product V(t) and of a reference vector product $V(t_{ref})$ estimated by the first estimation module EST1 at a reference instant $t_{ref}$:

$$B(t) \cdot B(t_{ref}) = Bx(t) \cdot Bx(t_{ref}) + By(t) \cdot By(t_{ref}) + Bz(t) \cdot Bz(t_{ref}).$$

The first detection module DETEC1 is adapted for detecting a change of orientation of the projection on the basis of the scalar product calculated by the third calculation module CALC3 and of a third threshold, said vector products being normalized.

The third threshold can then equal $1-\alpha_3$, when said vector products V are normalized, $\alpha_3$ being able to equal, for example 0.1. For a system adapted to a swimmer, $\alpha_3$ may be fixed at 1, since the scalar product is either equal to 1 when the swimmer is on the same length, or to −1 when the swimmer has changed length with respect to that of the reference instant $t_{ref}$. The third threshold can then be fixed at 0.

As a variant, these diverse implementations could be carried out in parallel, making it possible to substantially limit the detection errors.

FIG. 4 illustrates a variant embodiment, in which the first computation module ELAB1 comprises a second module EST2 for estimating a quantity representative of the inclination of the magnetometer 3M with respect to said horizontal plane on the basis of the measurements of the accelerometer 3A, and comprises a fourth module CALC4 for calculating a quantity representative of the component in said horizontal plane of the measured magnetic field.

The quantity representative of the inclination of the magnetometer 3M with respect to said horizontal plane, can for example be directly the measurement of the accelerometer. Indeed, by combining the measurement of the magnetometer with that of the accelerometer, the inclination of the magnetic field with respect to the horizontal can be readily obtained. For example if it is assumed that the accelerometer measures gravity only ("static" assumption), said inclination is given by the angle formed between the two vectors of the measurements of the accelerometer 3A and of the magnetometer 3M. We note that this calculation of the inclination is never carried out.

The second estimation module EST2 comprises a fifth module CALC5 for calculating the North-East-Down geographical reference frame at the reference instant $t_{ref}$ in the reference frame of the magnetometer 3M, and a sixth module CALC6 for calculating a matrix for switching from the reference frame of the magnetometer 3M to the North-East-Down reference frame. The second estimation module EST2 also comprises a seventh module CALC7 for calculating the angles of pitch θ and of roll Ω of the magnetometer 3M with respect to the reference frame of the magnetometer at the reference instant, these angles representing the inclination of the sensor (magnetometer and accelerometer) with respect to the horizontal plane.

Stated otherwise, this embodiment implements a compensation of said inclination as follows.

At any instant t, the inclination of the sensor (pitch θ and roll Ω) is calculated by the seventh calculation module CALC7 by virtue of the accelerometer 3A, and the measurements of the magnetometer 3M are compensated so as to be referred to the horizontal plane.

A(t) and B(t), the measurements of the accelerometer and the magnetometer are vectors of dimension three.

At the reference instant $t_{ref}$ the North-East-Down geographical reference frame, or NED, is calculated in the reference frame of the magnetometer 3M by the fifth calculation module CALC5. The East direction is given by the vector product of the measurement of the accelerometer 3A with the measurement of the magnetometer $E=A(t_{ref})\char`^B(t_{ref})$. The Down direction (downward vertical) is given by the measurement of the accelerometer $A(t_{ref})$. The North direction is given by the vector product of East (E) and of Down (D): $N=E\char`^D$.

The switching matrix NED=[N;E;D] of dimension 3×3 where the vectors N, E and D are row vectors of dimension 1×3 is computed by the sixth calculation module CALC6. The measurements are transformed by $A_{NED}(t)=NED.A(t)$ and $B_{NED}(t)=NED.B(t)$.

At any instant t, the inclination of the magnetometer 3M (pitch θ and roll Ω) is calculated by virtue of the accelerometer 3A by inverting the equation:

$$A_{NED}(t)=M(\theta,\Omega)[0\ 0\ 1]=[-\sin(\theta); \cos(\theta)*\sin(\Omega); \cos(\theta)*\cos(\Omega)]$$

At any instant t, the measurements of the magnetometer 3M are compensated so as to refer them to said horizontal plane, by the fourth compensation calculation module CALC4.

$B_{compensated}(t)=M'(\theta,\Omega)B_{NED}(t)$ where $M'(\theta,\Omega)$ is the transpose of the previously calculated matrix. The components of the magnetic field in said horizontal plane tied to the person are the first two components of $B_{compensated}(t)$.

The two-dimensional vector V obtained changes sign at each turnaround in said horizontal plane.

In this embodiment, the second estimation module EST2 comprises an eighth module CALC8 for calculating the sum of the squares of the components of the sum of the vector of the measurements of the magnetometer 3M in the horizontal plane and of a reference vector of the measurements of the magnetometer 3M in the horizontal plane at a reference instant $t_{ref}$, and the first detection module DETEC1 is adapted for detecting a change of orientation of the projection on the basis of the sum calculated by the eighth calculation module CALC8 and of the first threshold, said vectors being normalized.

The first threshold can then equal $4-\alpha_1$, $\alpha_1$ depending on the desired detection precision, $\alpha_1$ possibly being, for example, equal to 0.5 to detect arbitrary changes of direction, or 2 to detect about-turns or changes of direction of 180°.

FIG. 5 illustrates a variant of the embodiment of FIG. 4, for which the first computation module ELAB1 comprises a ninth module CALC9 for calculating an angular portion separating a vector of the measurements of the magnetometer 3M in the horizontal plane and a reference vector of the measurements of the magnetometer 3M in the horizontal plane at a reference instant $t_{ref}$, and the first detection module DETEC1 is adapted for detecting a change of orientation of the projection on the basis of the angular portion calculated by the ninth calculation module CALC9 and of the second threshold.

The threshold can then equal, for example, 30° if it is desired to detect changes of direction of greater than 30°, or 90° if it is desired to detect about-turns.

FIG. 6 illustrates a variant of the embodiments of FIGS. 4 and 5, for which the first computation module ELAB1 comprises a tenth module CALC10 for calculating a scalar product of a vector $B_{compensated}(t)$ of the compensated measurements of the magnetometer 3M in and of a reference vector $B_{compensated}(t_{ref})$ of the compensated measurements of the magnetometer 3M at a reference instant $t_{ref}$, and the first detection module DETEC1 is adapted for detecting a change of orientation of the projection on the basis of said scalar product calculated by the tenth calculation module CALC10 and of the third threshold, said vectors being normalized.

The third threshold can then equal $1-\alpha_3$, $\alpha_3$ depending on the desired detection precision, $\alpha_3$ possibly being, for example, equal to 0.1 if it is desired to detect small changes of direction, or 1 if it is desired to detect about-turns.

FIG. 7 illustrates a variant embodiment, in which the first computation module ELAB1 comprises a third module EST3 for estimating the angle of yaw of the magnetometer 3M with respect to said horizontal plane, on the basis of the measurements of the accelerometer 3A and of the magnetometer 3M.

At any instant the angle of yaw (Ω=rotation with respect to the vertical) of the magnetometer 3M with respect to a reference orientation is calculated. As previously, intermediate variables $A_{NED}(t)=NED.A(t)$ and $B_{NED}(t)=NED.B(t)$ may be calculated.

To calculate the angles, the following relations are used: $A_{NED}(t)=M(\phi,\theta,\Omega)A_{NED}(t_{ref})$ and $B_{NED}(t)=M(\phi,\theta,\Omega)B_{NED}(t_{ref})$ where $M(\phi,\theta,\Omega)$ is the rotation matrix (in the NED reference frame) to switch from the orientation of the magnetometer 3M at the reference instant ($t=t_{ref}$) to the orientation of the magnetometer 3M at the instant t.

In the case of counting outward-return journeys, in particular of a swimmer in a pool, the angle Ω equals 0° when on the same length and 180° when there is a change of length. A fourth threshold can therefore be fixed at 90°, or at 30° if it is desired to detect small changes of direction.

In FIG. 8, an embodiment of the system devoid of accelerometer is represented. The first computation module ELAB1 comprises an eleventh module CALC11 for calculating a scalar product of the vector of the measurement signals transmitted by the magnetometer 3M and of the vector of the measurement signals transmitted by the magnetometer 3M at said reference instant $t_{ref}$. The first detection module DETEC1 is adapted for detecting a change of orientation of the projection on the basis of the scalar product calculated by the eleventh calculation module CALC11 and of a fifth threshold, said vectors being normalized.

The threshold can then equal $1-\alpha_4$, $\alpha_4$ depending on the inclination of the magnetic field at the place of the measurements, for example $\alpha_4$ can equal 0.1.

For a system adapted for detecting about-turns, $\alpha_4$ may be fixed at 0.25, when the inclination of the magnetic field is 60° as in France.

FIG. 9 schematically represents a variant of the system adapted to swimming, comprising a second detection module DETEC2, similar to the first detection module DETEC1, for detecting a change of sign of the acceleration vector measured by the accelerometer 3A, representative of a change between a frontstroke and a backstroke of the swimmer. This detection of change of sign, can also be carried out in several different ways.

In this instance, a twelfth calculation module CALC12 makes it possible to calculate the sum of the squares of the components of the sum of an acceleration vector A(t) measured by said accelerometer 3A and of a reference acceleration vector $A(t_{ref})$ measured by said accelerometer 3A at a reference instant $t_{ref}$. The second detection means DETEC2 are adapted for detecting a change between a frontstroke and a backstroke of the swimmer on the basis of the sum calculated by said twelfth calculation means CALC12 and of a sixth threshold, said vectors being normalized.

The sixth threshold can then equal 3 or 2.

When the sixth threshold is chosen equal to 3, the detection sensitivity of the system is higher than when the threshold is chosen equal to 2.

FIG. 10 schematically represents a variant of the system of FIG. 9, in which the second detection module DETEC2 comprises a thirteenth module CALC13 for calculating an angular portion separating the acceleration vector A(t) measured by the accelerometer 3A and a reference acceleration vector $A(t_{ref})$ measured by the accelerometer 3A at a reference instant $t_{ref}$. The second detection module DETEC2 is adapted for detecting a change between a frontstroke and a backstroke of the swimmer on the basis of the angular portion calculated by the thirteenth calculation module CALC13 and of a seventh threshold.

The seventh threshold can then equal 60° or 90°.

When the seventh threshold is chosen equal to 60°, the detection sensitivity of the system is higher than when the threshold is chosen equal to 90°.

FIG. 11 schematically represents a variant of the system of FIG. 9 or of FIG. 10, in which the second detection module DETEC2 comprises a fourteenth module CALC14 for calculating a scalar product of the acceleration vector A(t) measured by the accelerometer 3A and of a reference acceleration vector $A(t_{ref})$ measured by the accelerometer 3A at a reference instant $t_{ref}$. The second detection module DETEC2 is adapted for detecting a change between a frontstroke and a backstroke of the swimmer on the basis of said scalar product calculated by the fourteenth calculation module CALC14 and of an eighth threshold, said vectors being normalized.

The eighth threshold can then equal 0.5 or 0.

When the eighth threshold is chosen equal to 0.5, the detection sensitivity of the system is higher than when the threshold is chosen equal to 0.

The second detection module DETEC2 is adapted for updating a fixed reference instant $t_{ref}$ upon detection of a change between a frontstroke and a backstroke of the swimmer.

FIG. 12 illustrates a system comprising a third module DETEC3 for detecting a change between a frontstroke and a backstroke of the swimmer when the scalar product calculated by the eleventh calculation module CALC11 switches from a positive value to a negative value. The reference instant $t_{ref}$ is relative.

The first and second examples which follow illustrate respectively a manner of operation of a system according to FIG. 1 adapted to swimming, without changes between a frontstroke and a backstroke of the swimmer, and a manner of operation of the system of FIG. 11, adapted to swimming, with changes between a frontstroke and a backstroke of the swimmer.

The first example is illustrated by FIGS. 13a, 13b, 13c, 13d, 13e, 13f and 13g.

Figure 1:
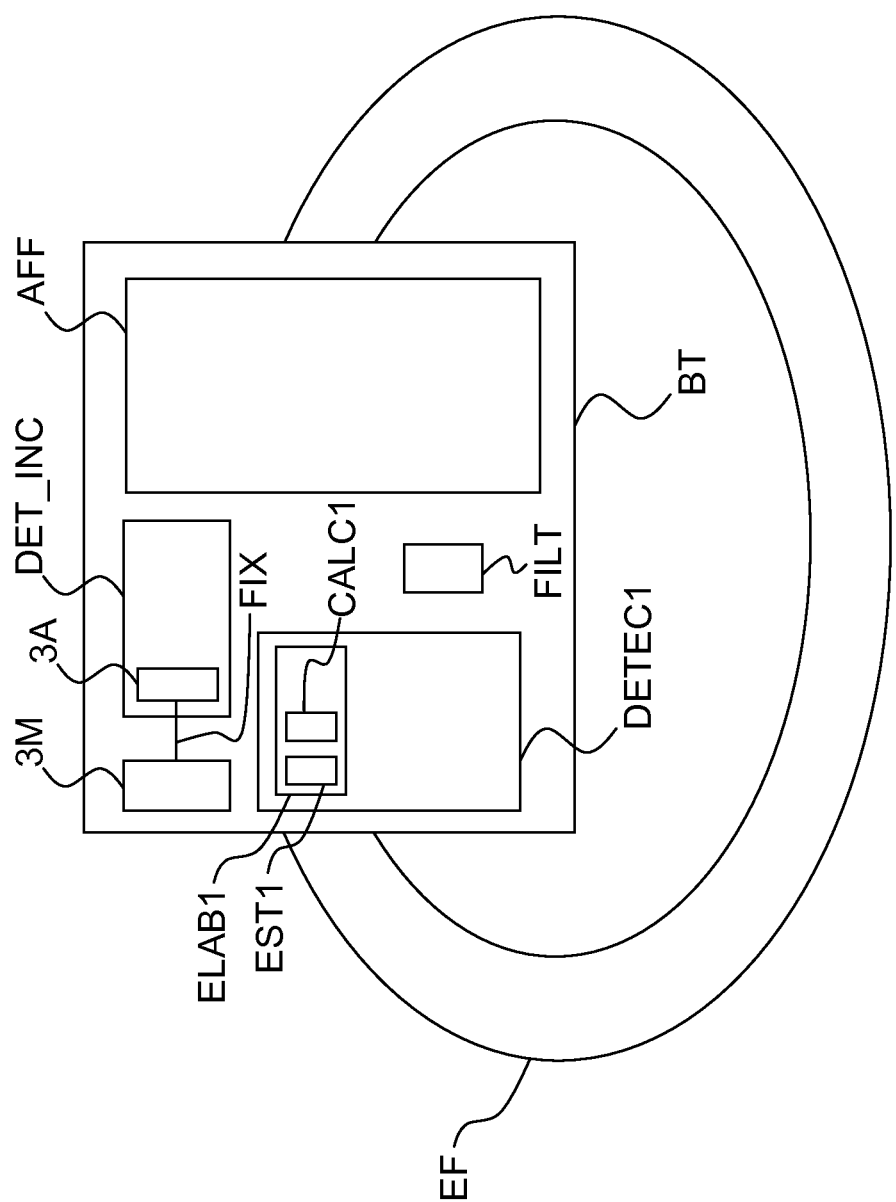
Figure 2:
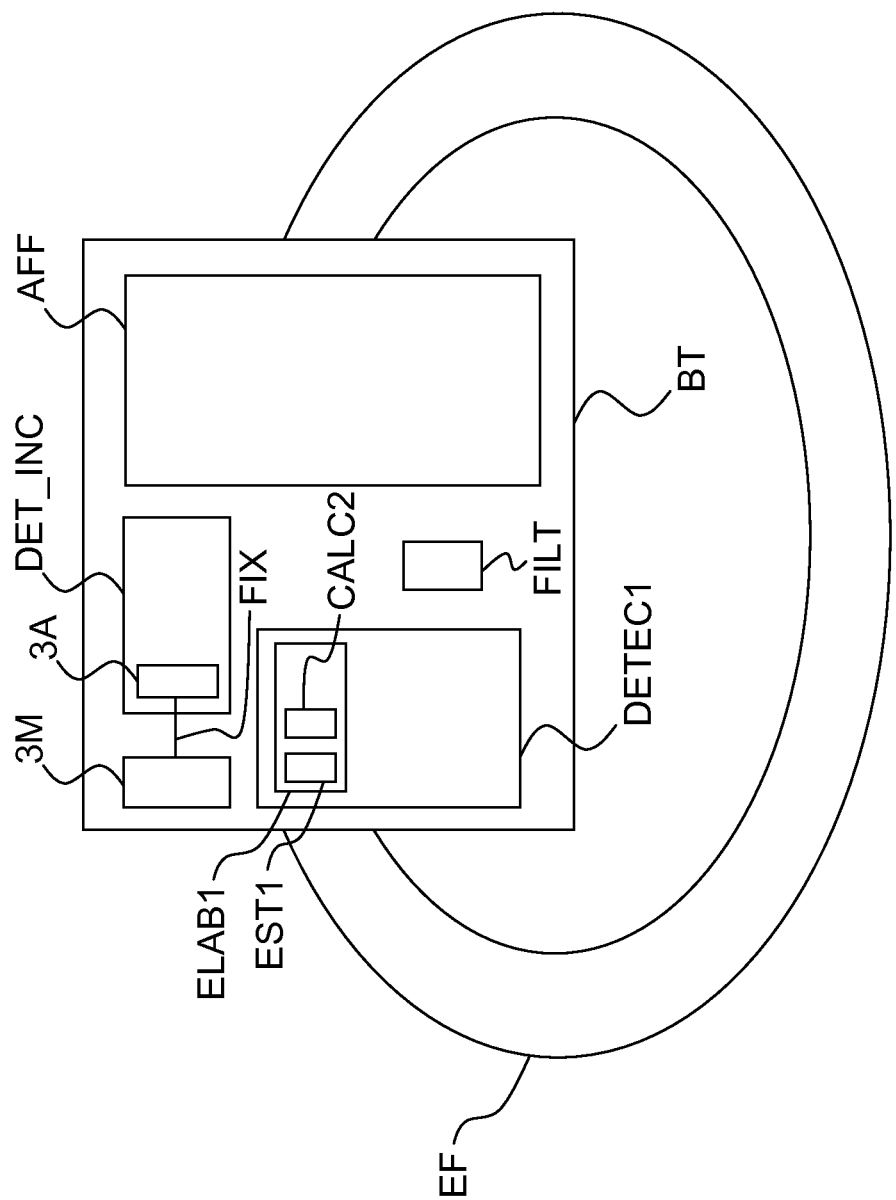
Figure 3:
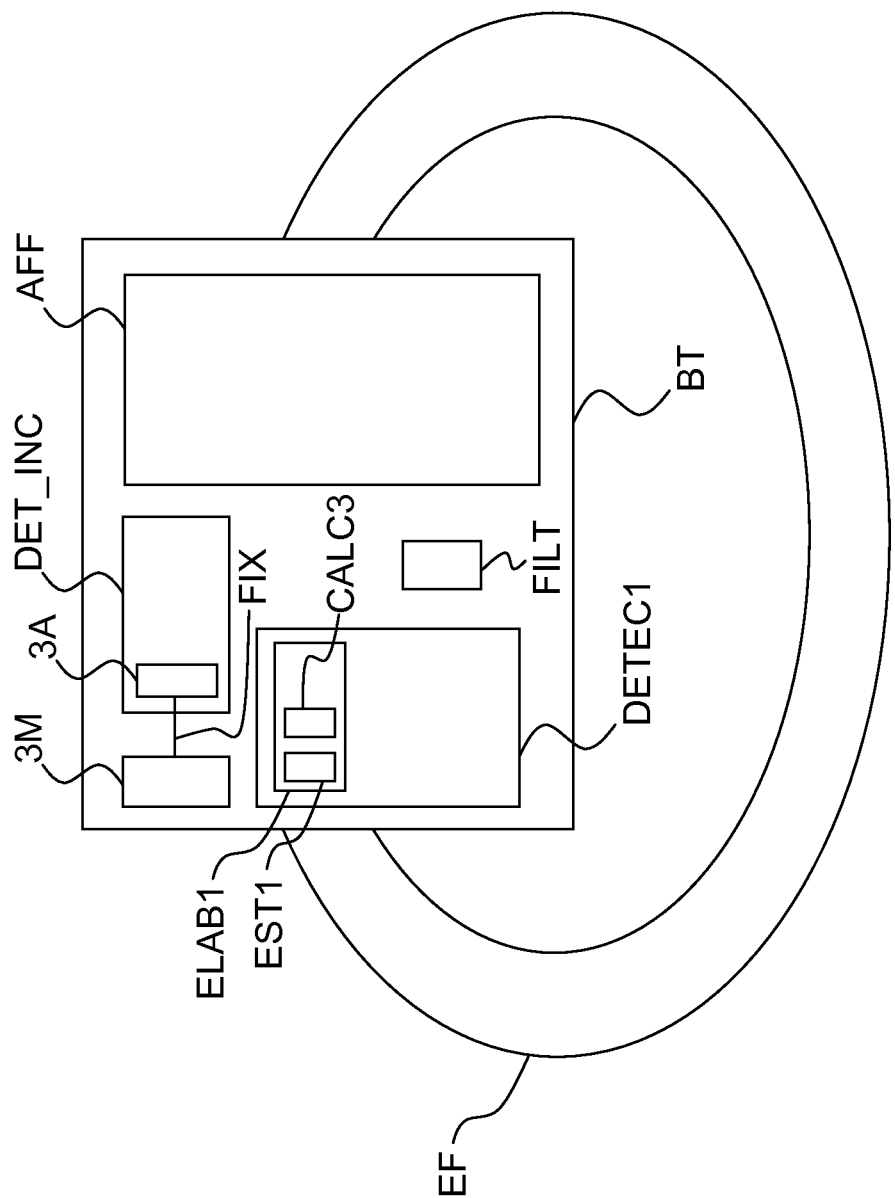
Figure 4:
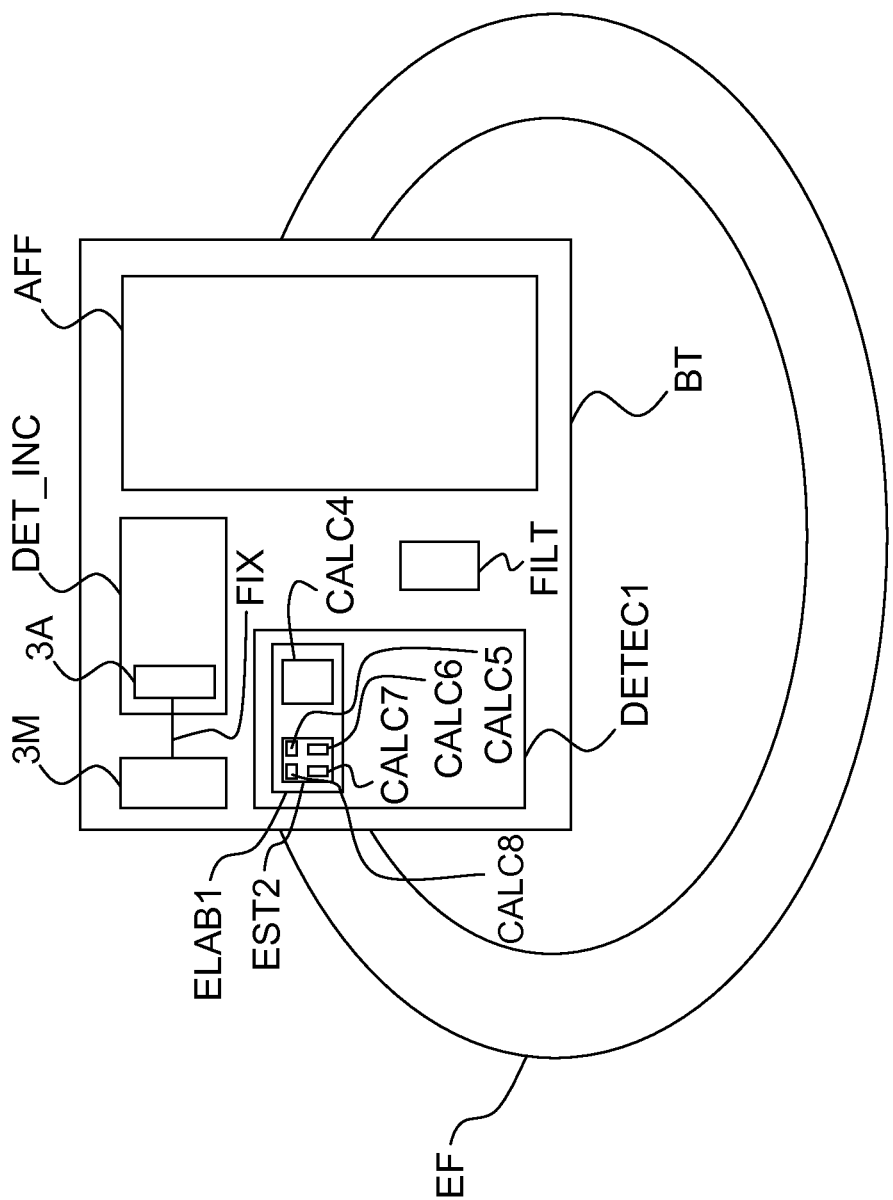
Figure 5:
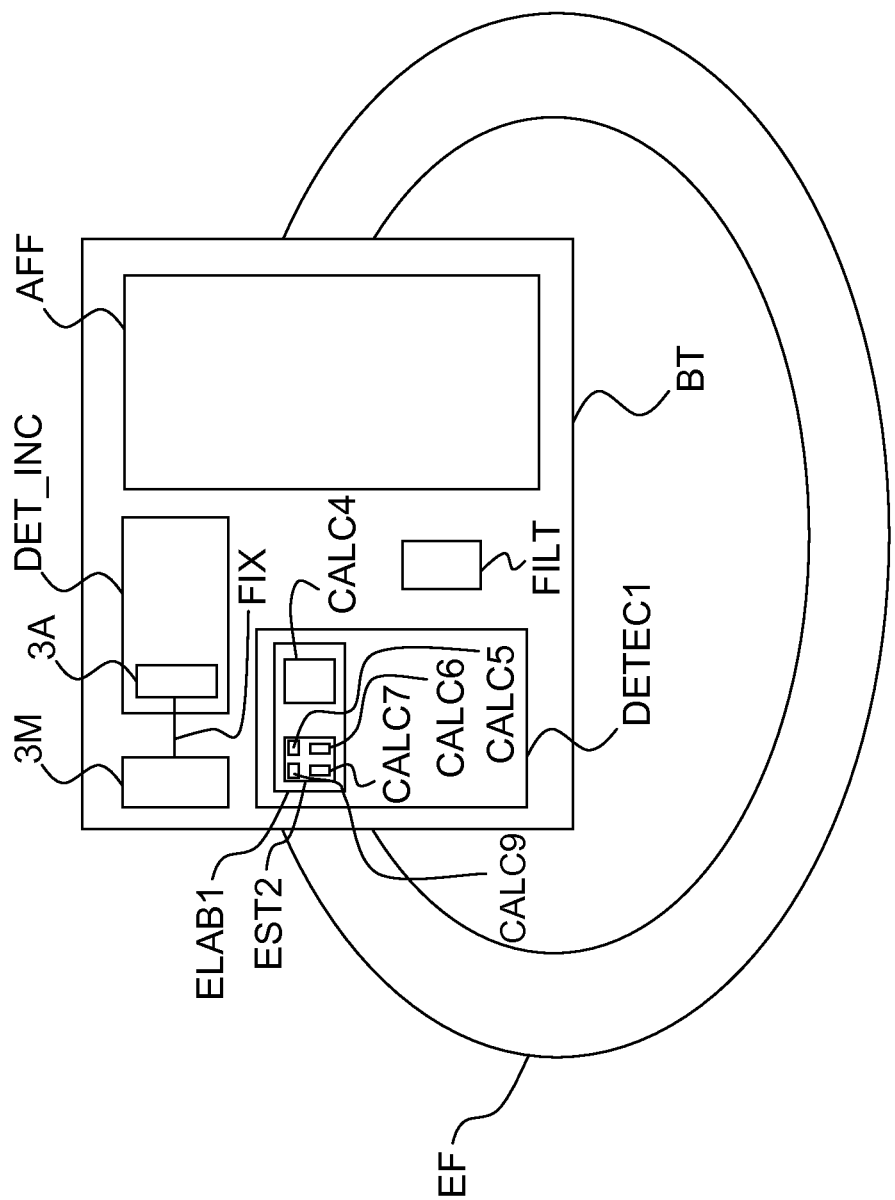
Figure 6:
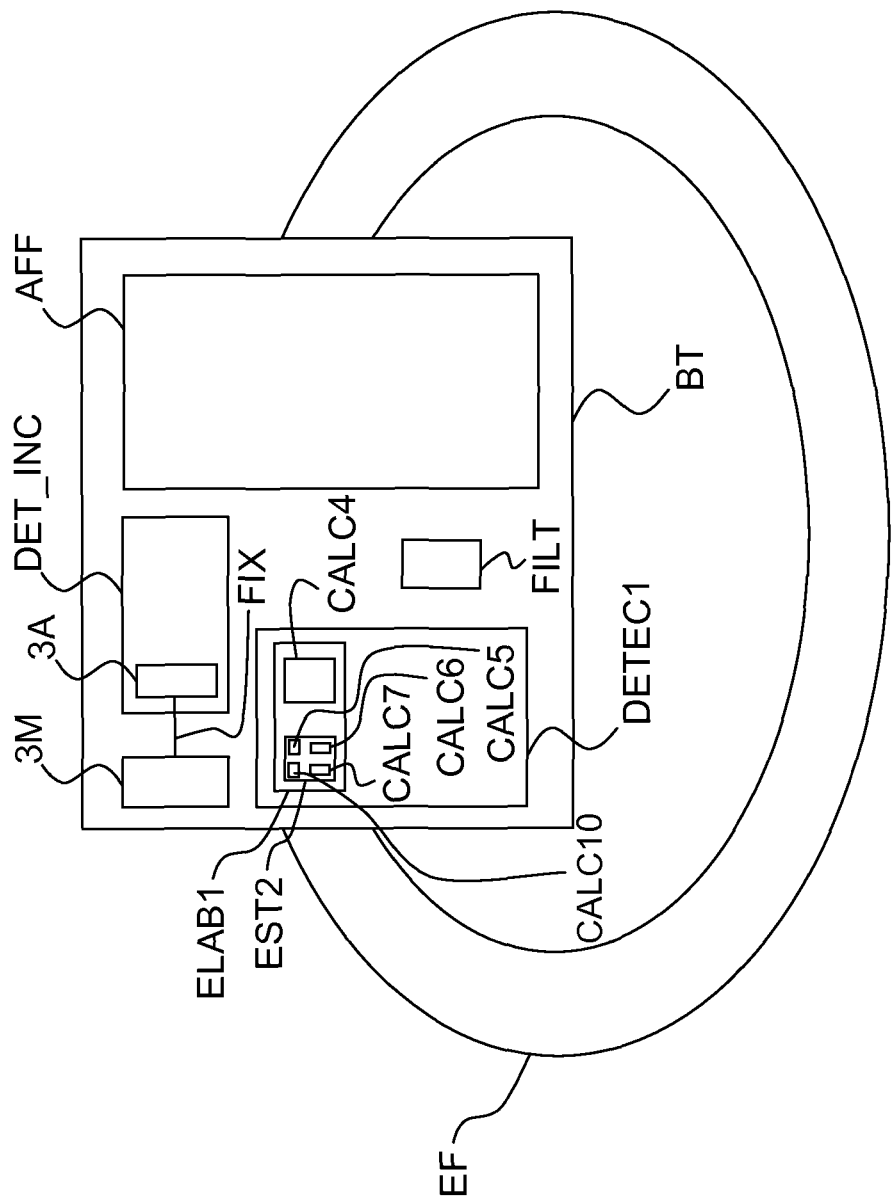
Figure 7:
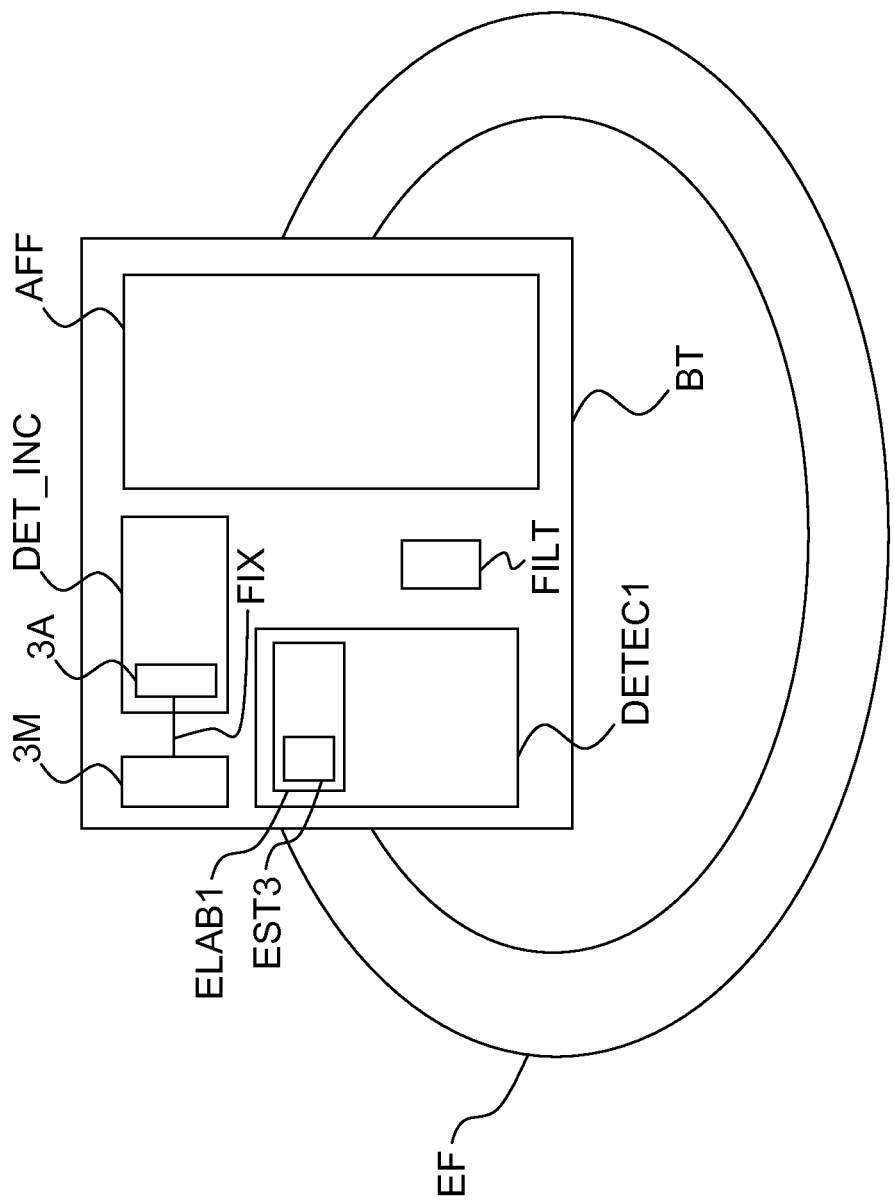
Figure 8:
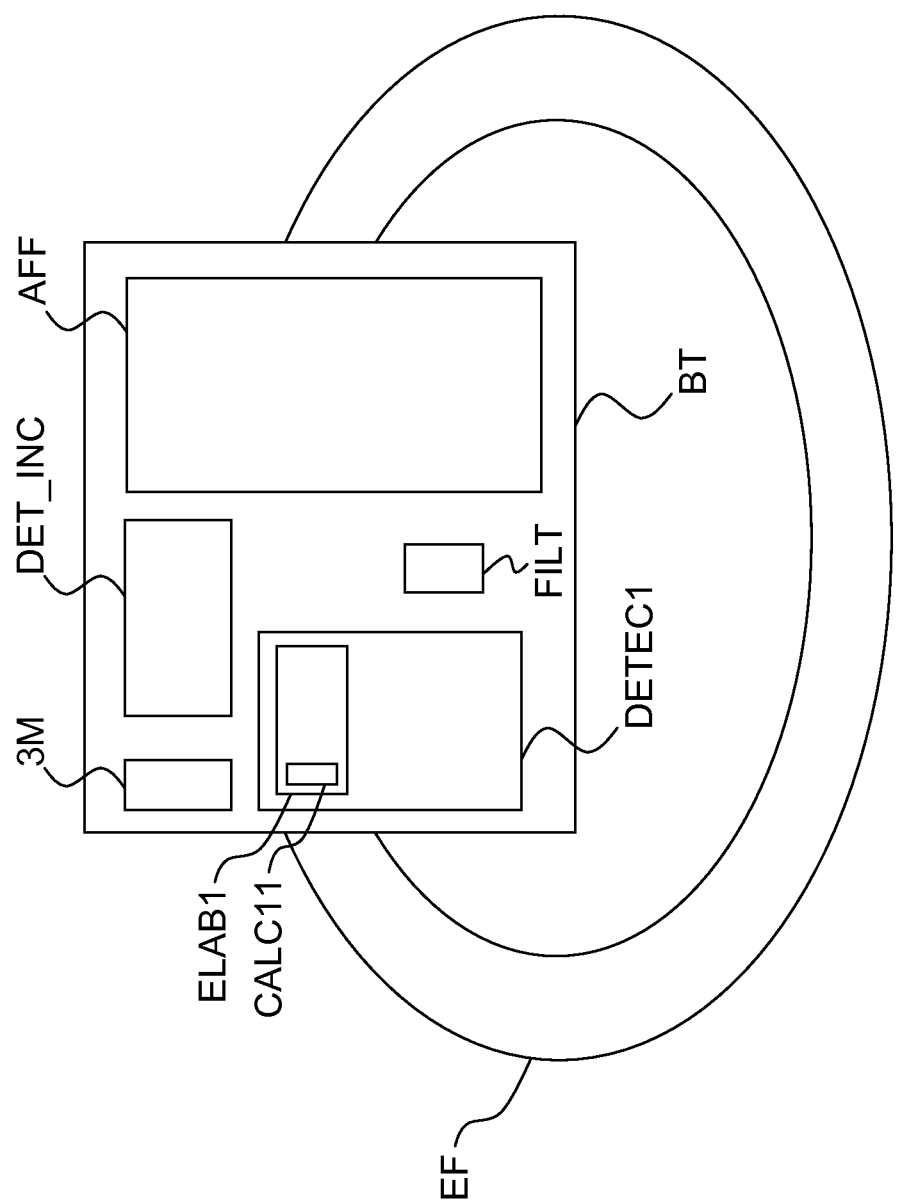
Figure 9:
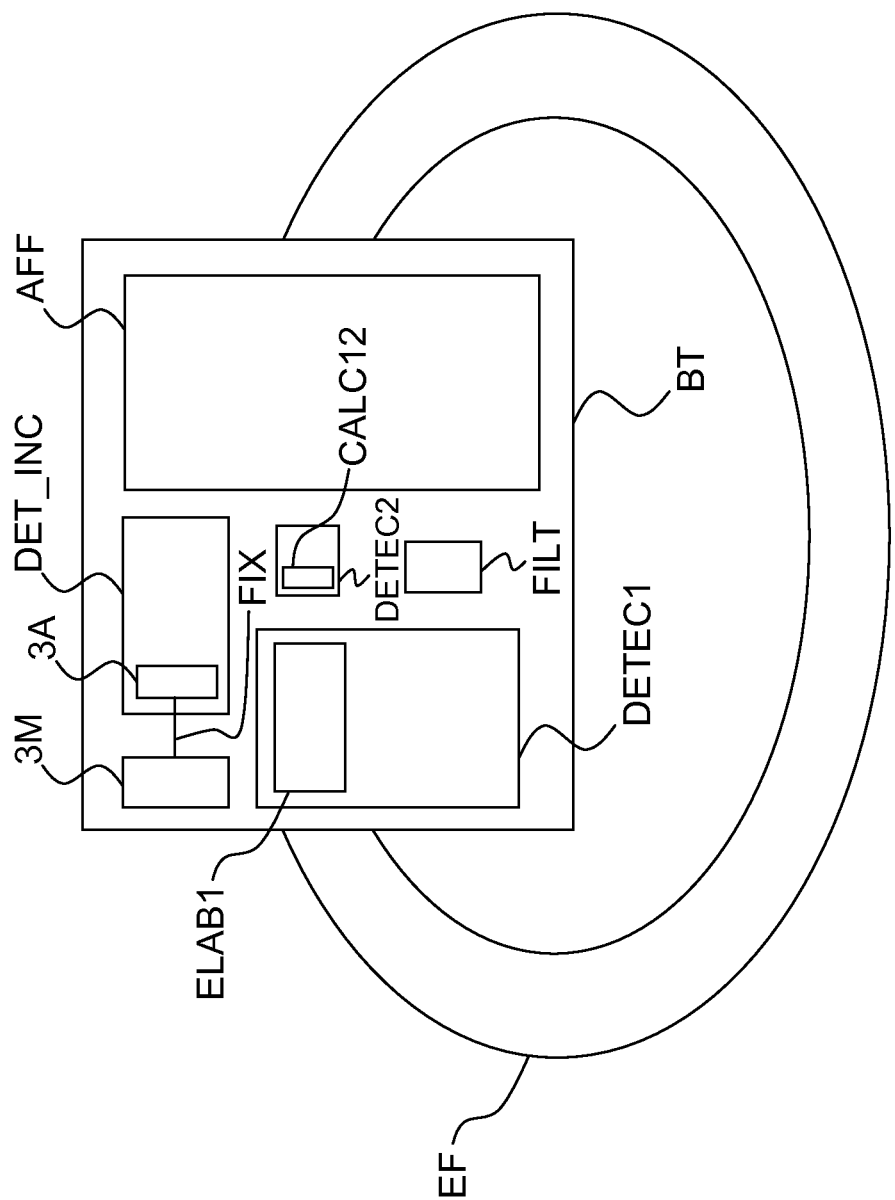
Figure 10:
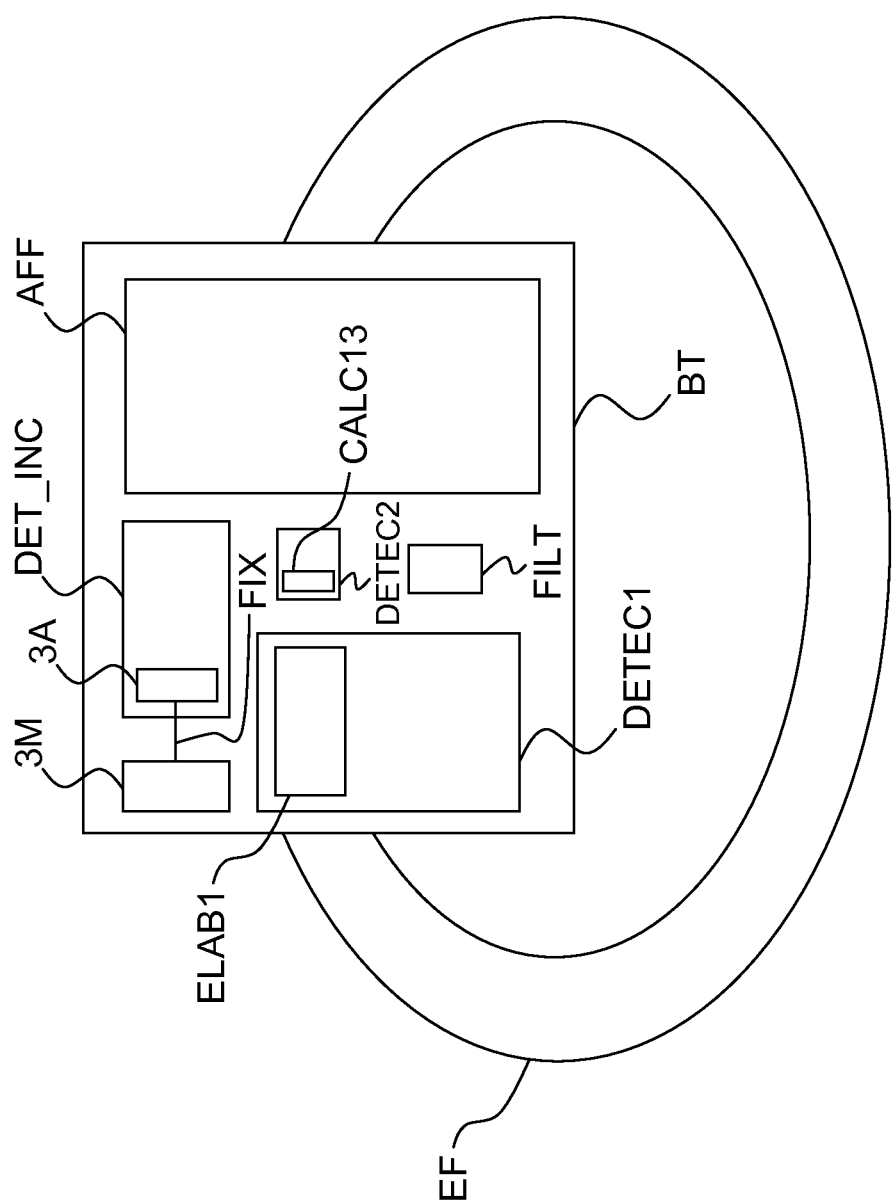
Figure 11:
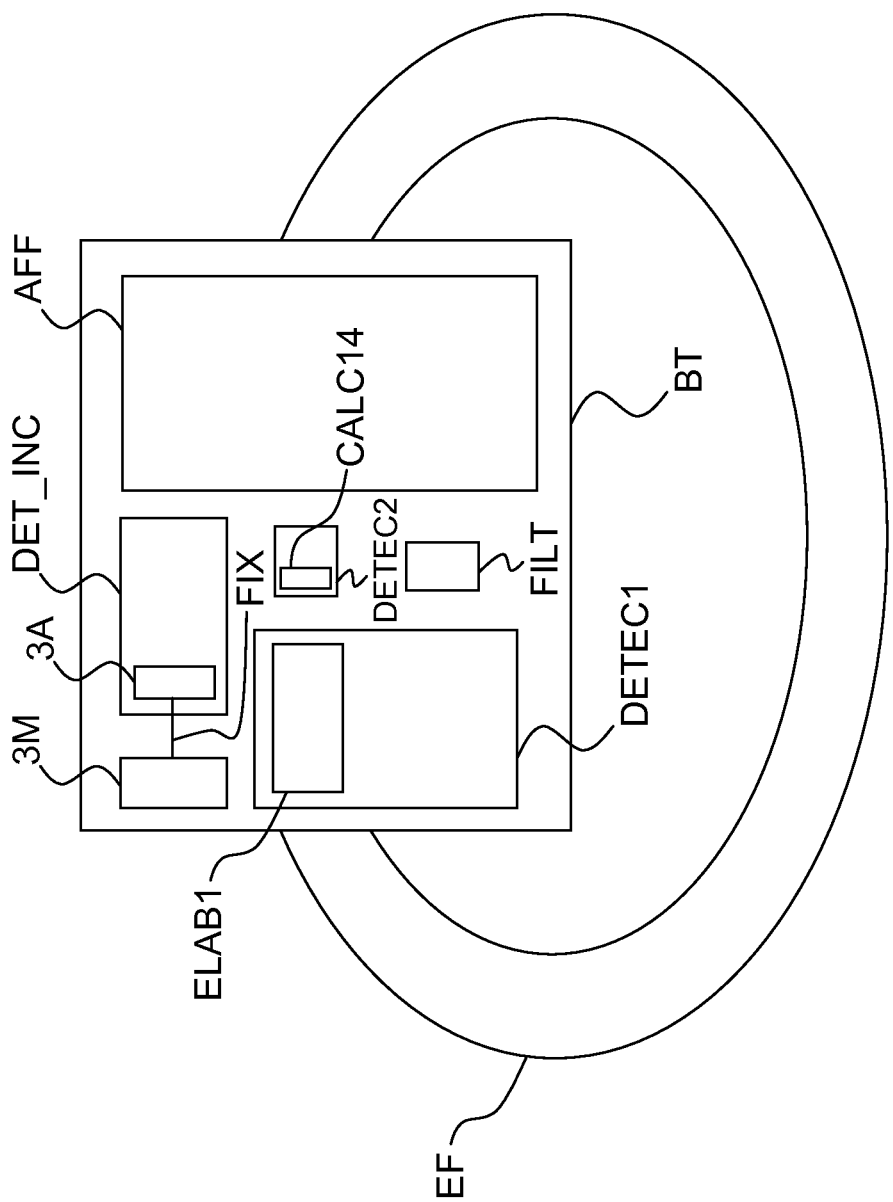
Figure 12:
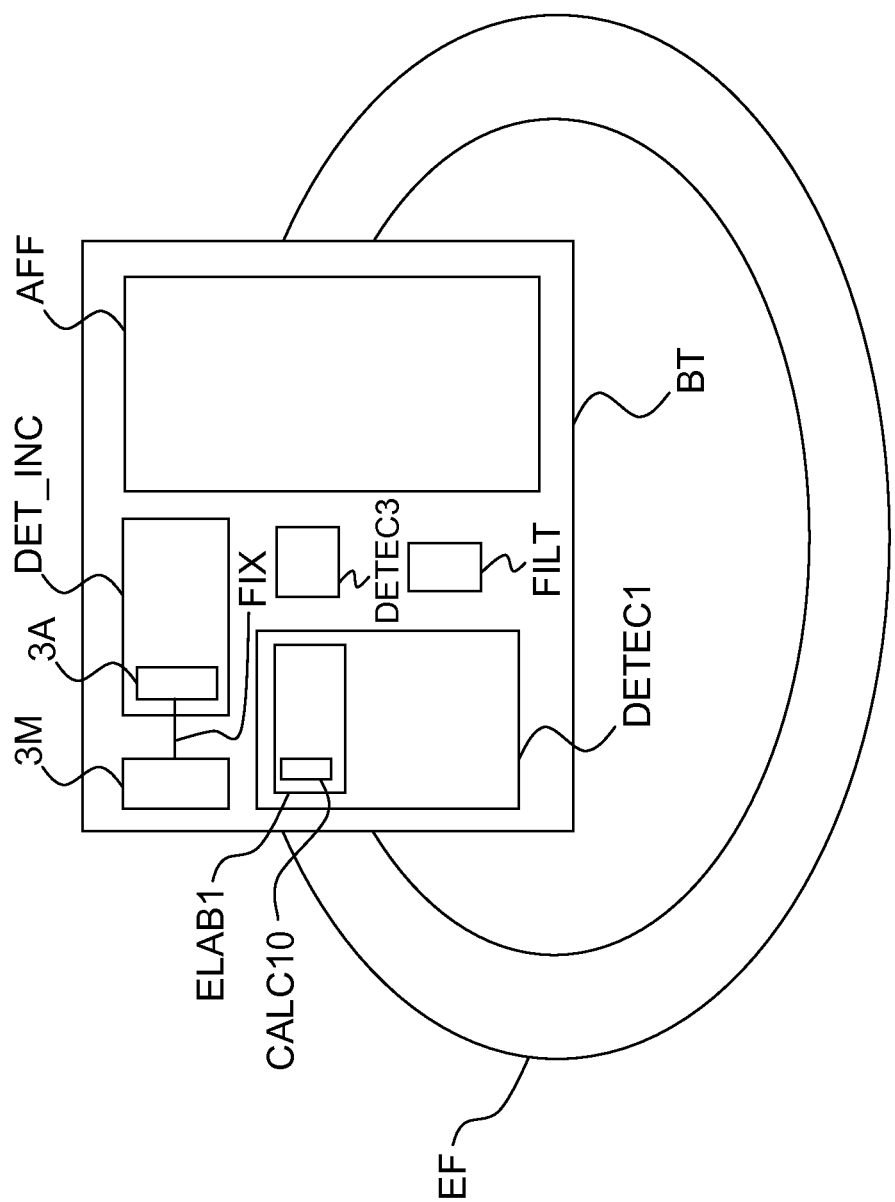
Figure 13A:
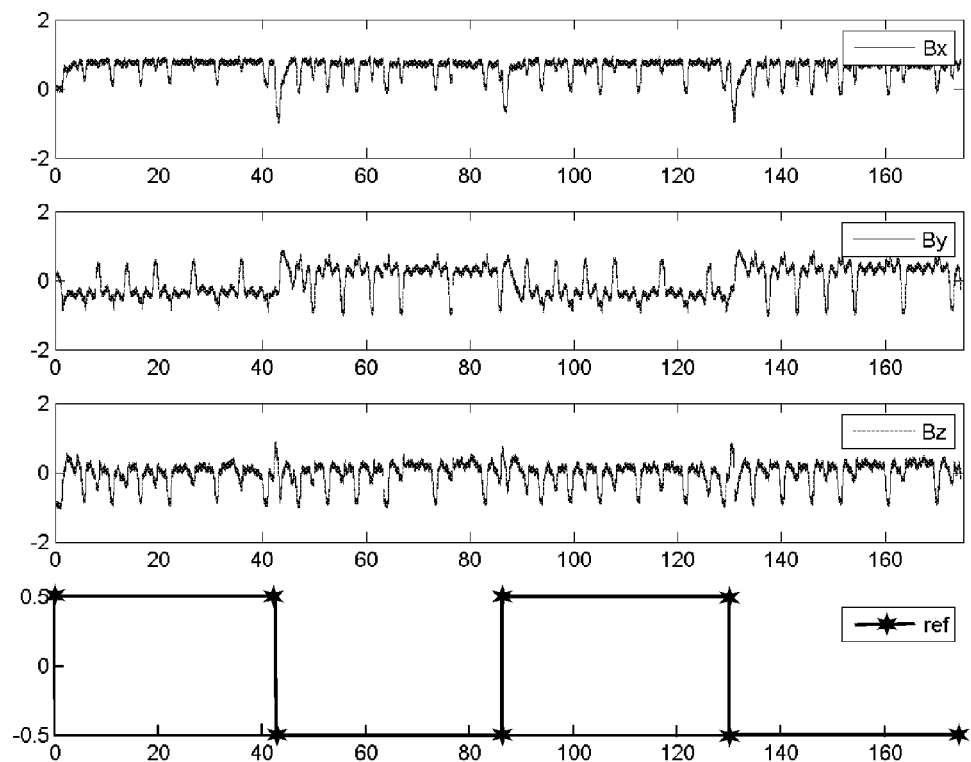
FIG. 13a represents the measurement signals along the three axes of the magnetometer 3M corresponding to a swimming session of a swimmer comprising two outward-return journeys of a pool fifty meters in length. The reference signal REF represents the outward journeys (value at 0.5) and the return journeys (value at −0.5).
Figure 13B:
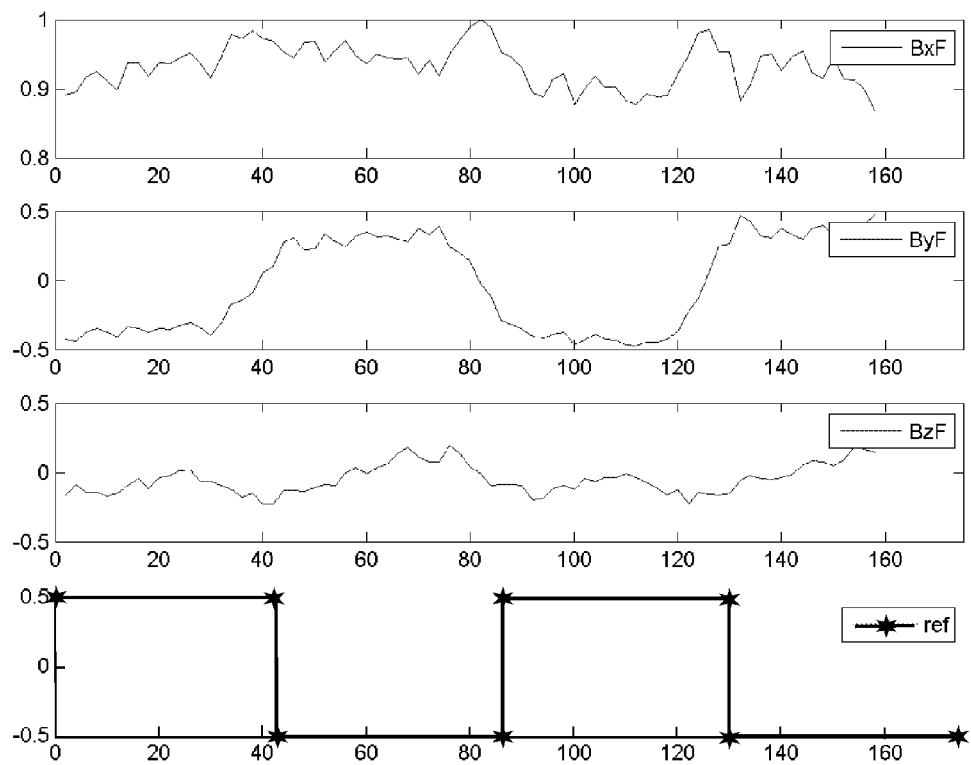
FIG. 13b represents the measurement signals of the magnetometer 3M of FIG. 13a after filtering by averaging over a sliding window of 16 s, and sub-sampling.
Figure 13C:
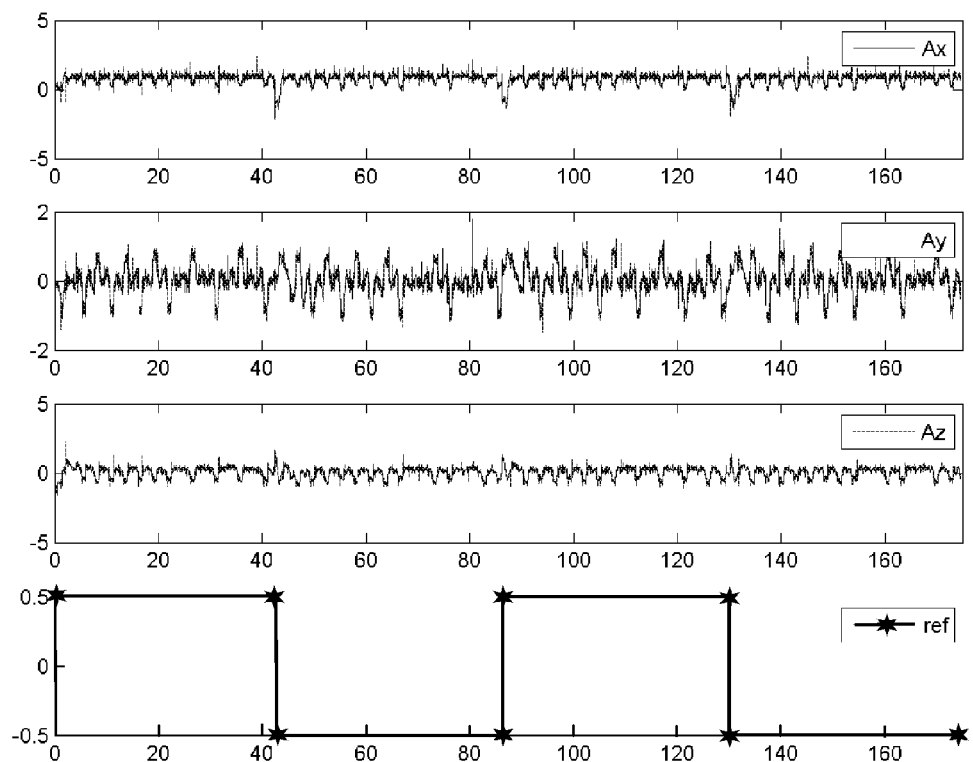
FIG. 13c represents, for this swimming session, the measurements of the accelerometer 3A.
Figure 13D:
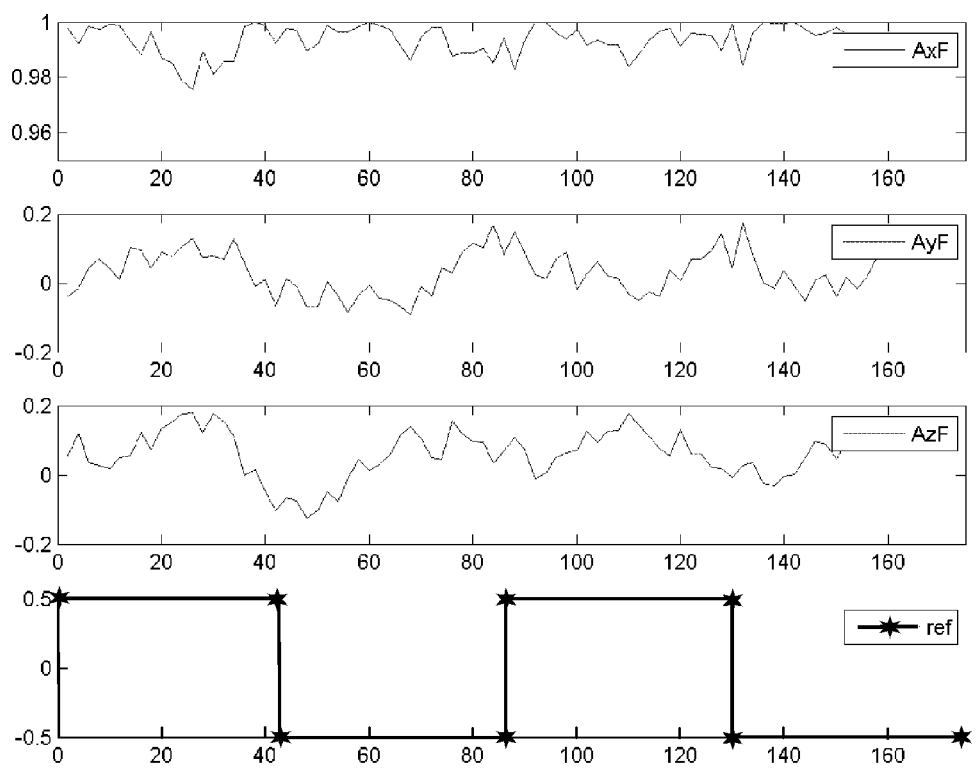
FIG. 13d represents the measurements of the accelerometer 3A after filtering by averaging over a sliding window of 16 s, and sub-sampling.
Figure 13E:
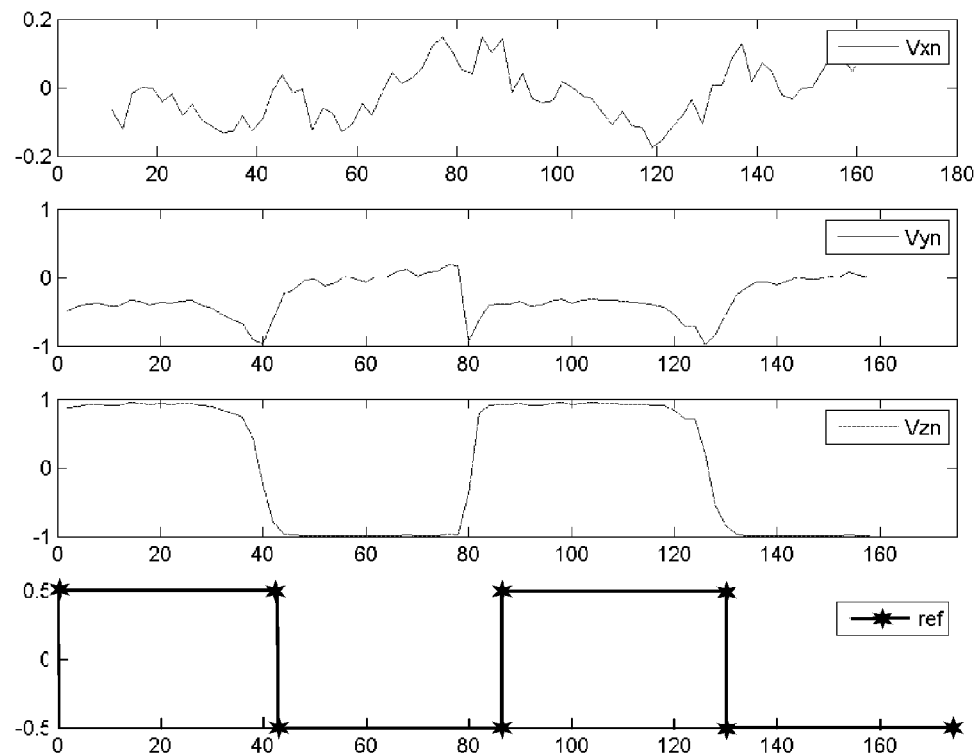
FIG. 13e represents the components of the vector product of the filtered magnetic field of FIG. 13b and of the filtered gravity field of FIG. 13d performed by the first estimation means EST1 and normalized.
Figure 13F:
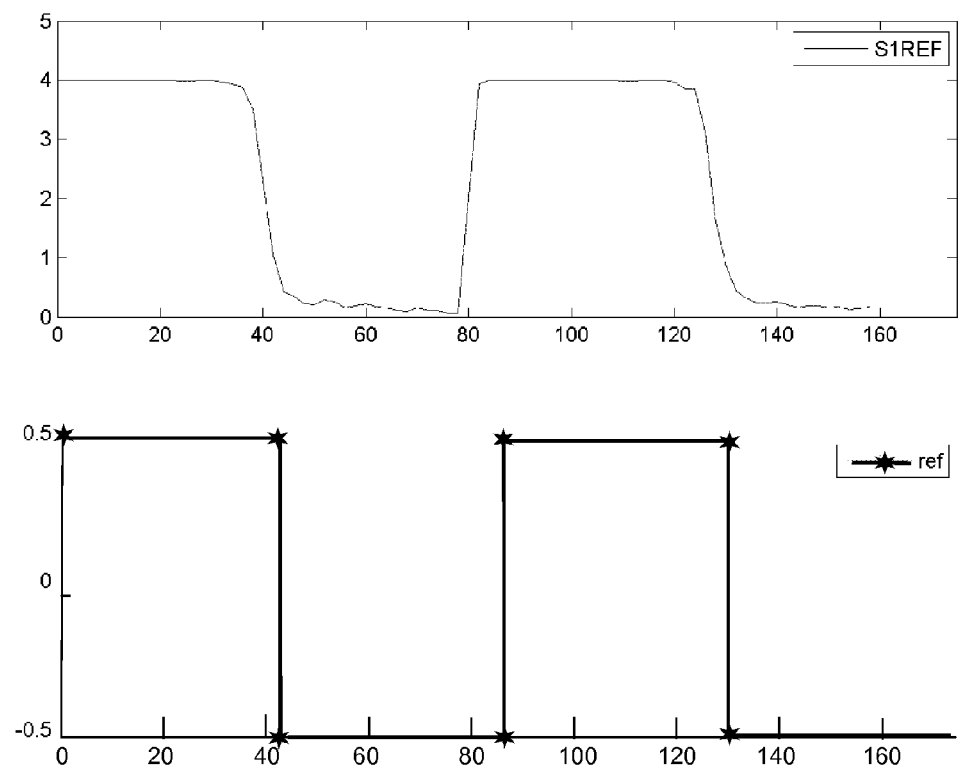

FIG. 13f represents the signal S1REF representative of the change of direction, in this instance of an about-turn of the swimmer, calculated by the first calculation means CALC1, with the reference instant $t_{ref}$ fixed and is taken at $t_{ref}=10$ s. In this case, the first detection module DETEC1 detects passes of the signal S1REF either side of the threshold equal to 2. In the vicinity of t=40 s, a pass below the threshold is detected, and then a pass above the threshold in the vicinity of t=80 s, and then again a pass below the threshold in the vicinity of t=130 s. The system has therefore detected 3 about-turns, thereby corresponding to 4 pool lengths, and since the pool has a length of 50 m, to 200 m.

Figure 13G:
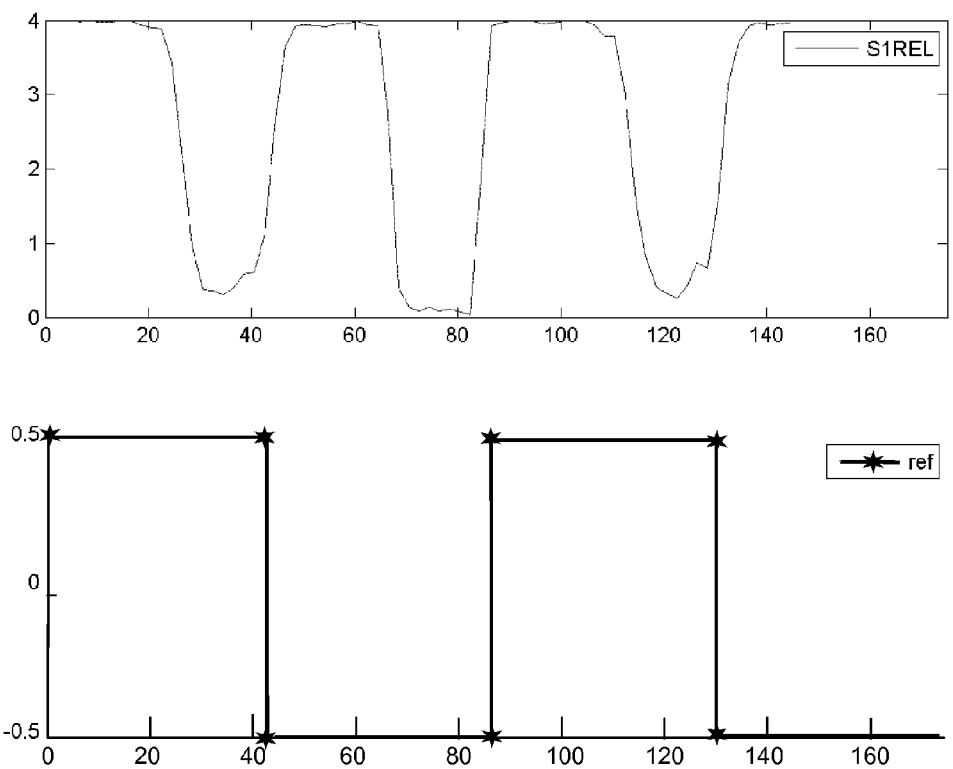

As a variant, represented in FIG. 13g is the signal delivered by the first calculation module CALC1, with a relative reference instant on the basis of the present instant t shifted into the past by a constant duration, in this instance equal to 9 s. Three spikes are detected when the signal passes below the threshold taken equal to 2.

The second example is illustrated by FIGS. 14a, 14b, 14c, 14d, 14e, and 14f.

Figure 14A:
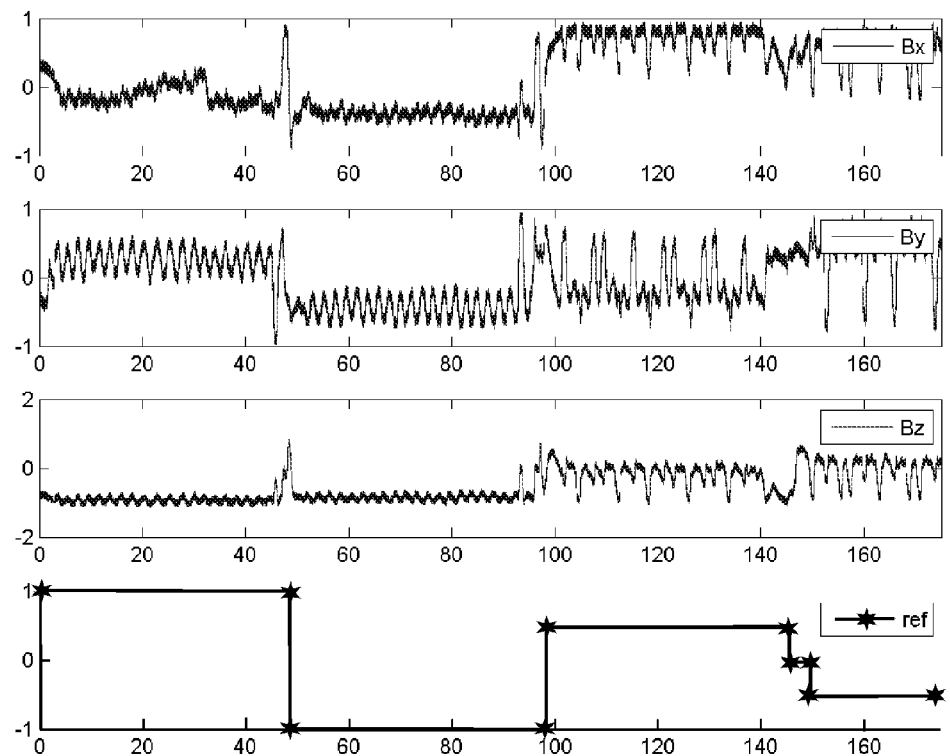

FIG. 14a represents the measurement signals along the three axes of the magnetometer 3M corresponding to a swimming session of a swimmer comprising two outward-return journeys of a pool fifty meters in length. The reference signal REF represents an outward journey on his back (REF=1), followed by a return journey on his back (REF=−1) and then by an outward journey on his front (REF=0.5), and then by a return journey on his front (REF=−0.5).

Figure 14B:
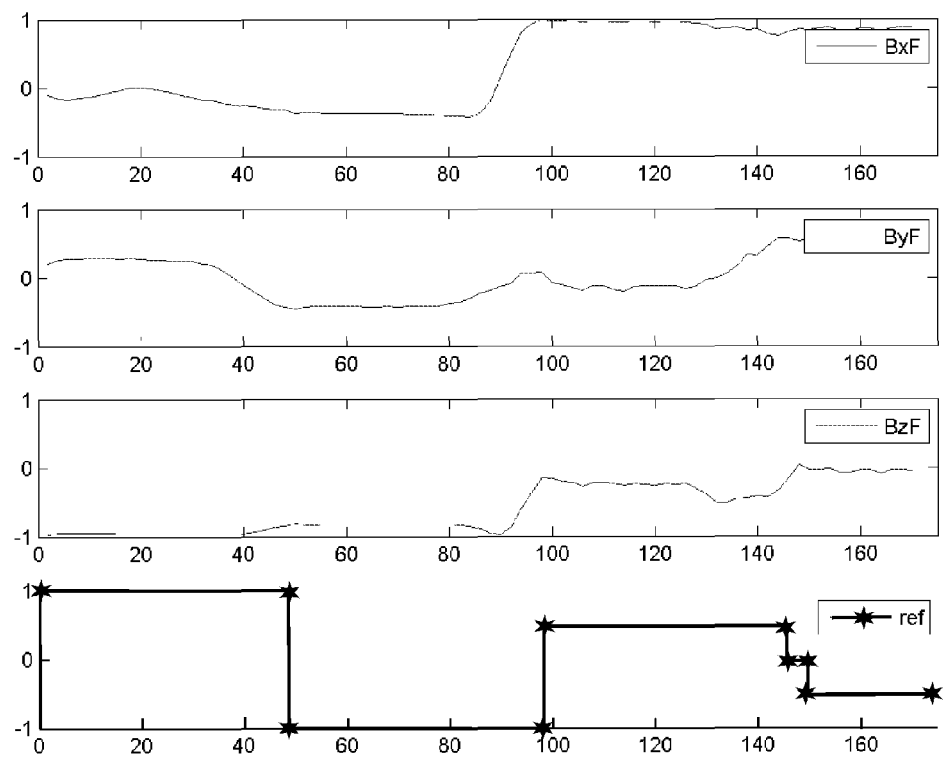

FIG. 14b represents the measurement signals of the magnetometer 3M of FIG. 14a after filtering by averaging over a sliding window of 16 s, and sub-sampling.

Figure 14C:
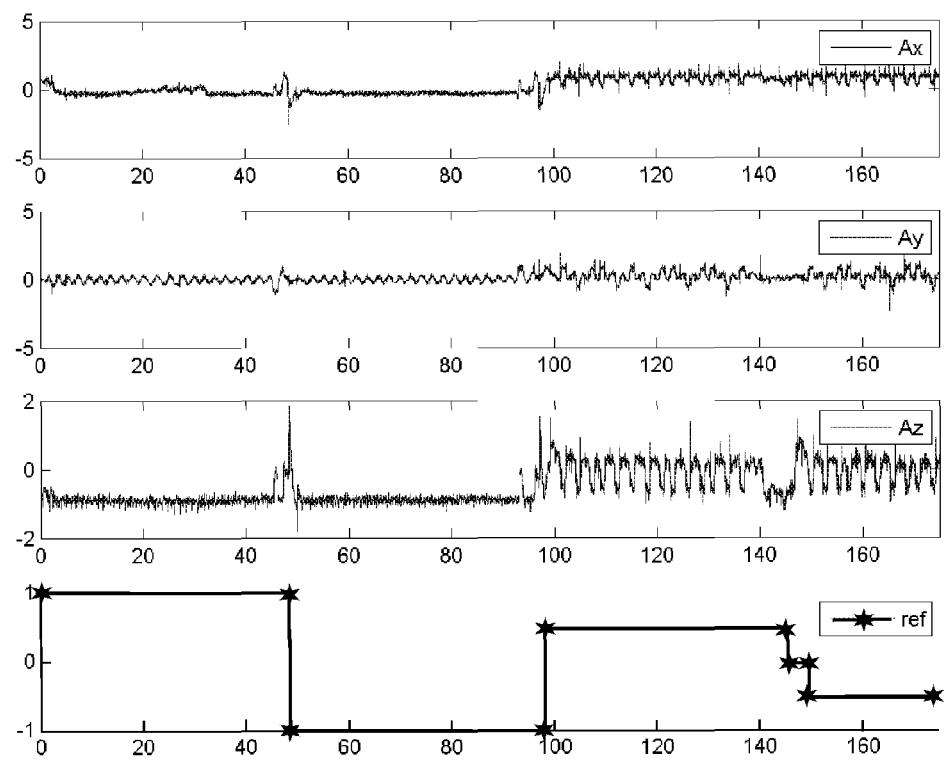
Figure 14D:
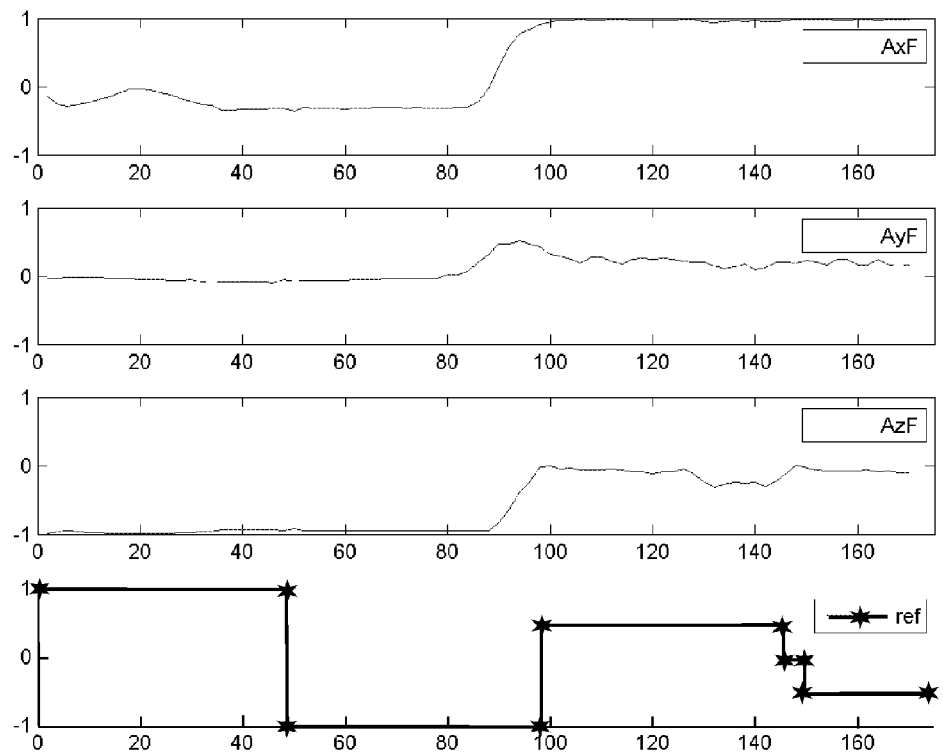

FIG. 14c represents, for this swimming session, the measurements of the accelerometer 3A, and FIG. 14d represents the measurements of the accelerometer 3A after filtering by averaging over a sliding window of 16 s, and sub-sampling.

Figure 14E:
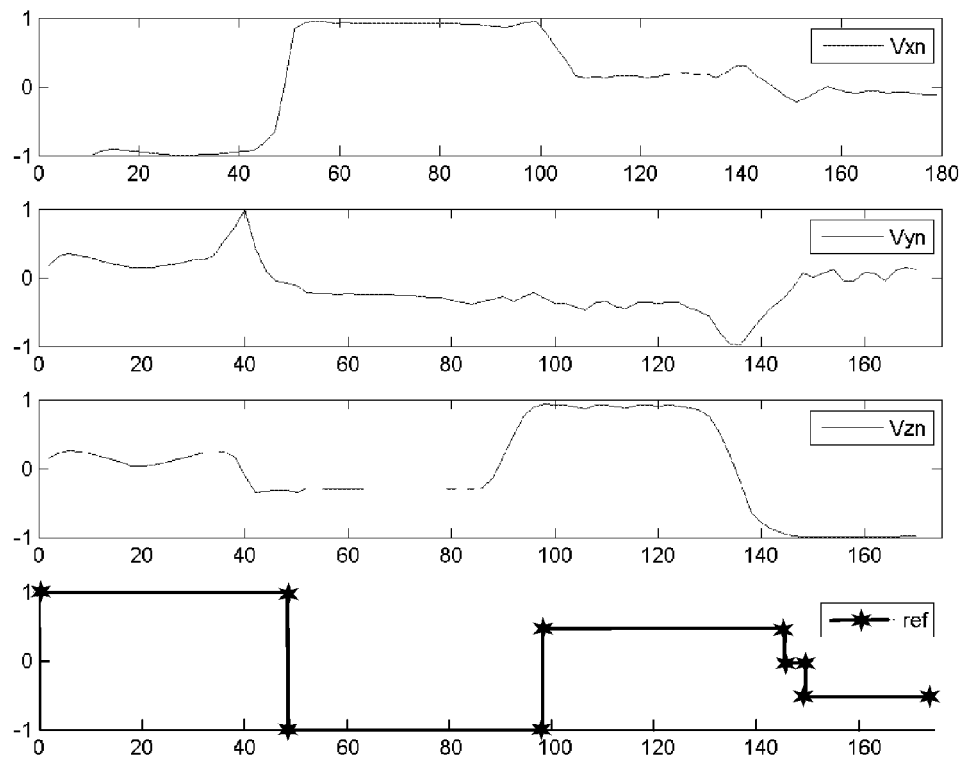

FIG. 14e represents the components of the vector product of the filtered magnetic field of FIG. 14b and of the filtered gravity field of FIG. 14d performed by the first estimation means EST1 and normalized.

Figure 14F:
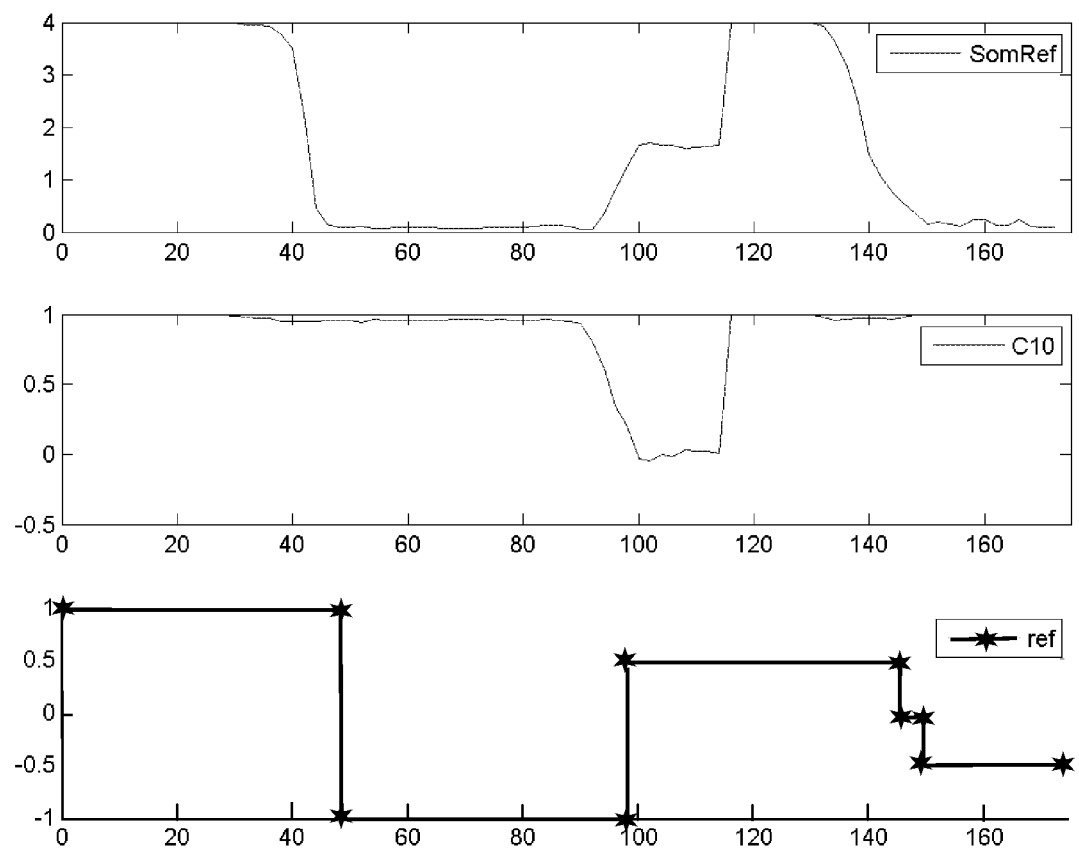

FIG. 14f represents the signal SOMREF representative of the change of direction, in this instance of an about-turn of the swimmer, calculated by the first calculation means CALC1, with the reference instant $t_{ref}$ fixed and updated during a detection of a change between a frontstroke and a backstroke, as well as the signal C10 calculated by the fourteenth calculation module CALC14. In this case, the first detection module DETEC1 detects a pass of the signal SomRef under the threshold equal to 2 (about-turn) for a sufficiently long time, in this instance 10 s. In the vicinity of t=100 s, the second detection module DETEC2 detects a pass of the signal C10 below the threshold equal to 0.5 (change between a frontstroke and a backstroke) for a sufficiently long time, in this instance 10 s. This detection counts as an about-turn. The reference instant $t_{ref}$ is updated in the vicinity of t=120 s. An about-turn is detected in the vicinity of t=140 s, when the signal SomRef passes above the threshold for a sufficiently long time, in this instance 10 s. The system has therefore detected 3 about-turns, thereby corresponding to 4 pool lengths, and since the pool has a length of 50 m, to 200 m.

The invention claimed is:

1. A system for counting changes of direction of a person, comprising a housing and fixing means for coupling the housing to the person, the system further comprising:
    a magnetometer for measuring a direction of a terrestrial magnetic field in a reference frame of the housing;
    a determination module configured to determine a quantity representative of an inclination of the measured magnetic field with respect to vertical; and
    a first detection module configured to detect a change of orientation of an orthogonal projection of the direction of the terrestrial magnetic field in a horizontal planar reference frame having axes of constant directions and tied in translation to the person, on the basis of the measured direction of the magnetic field and of the quantity representative of the inclination of the magnetic field with respect to the vertical, and to generate a signal representative of the change of orientation with respect to a reference orientation corresponding to a reference instant.

2. The system as claimed in claim 1, wherein the reference instant is fixed and the first detection module is further configured to detect a change of orientation of the projection when the representative signal changes relative position with respect to a threshold.

3. The system as claimed in claim 1, wherein the reference instant is relative, on a basis of a present instant shifted into the past by a constant duration, and the first detection module is further configured to detect a change of orientation of the projection when the representative signal exhibits a value above or below a threshold.

4. The system as claimed in claim 1, wherein the determination module is further configured to determine the quantity representative of the inclination on the basis of at least one stored value of the inclination.

5. The system as claimed in claim 1, wherein the determination module is further configured to determine the quantity representative of the inclination on the basis of at least one measurement performed with the magnetometer oriented along a known direction.

6. The system as claimed in claim 1, wherein the determination module further comprises an accelerometer with a plurality of measurement axes and connected to the accelerometer in a substantially constant relative orientation with respect to the magnetometer, and is configured to determine the quantity representative of the inclination on the basis of the measurements of the accelerometer.

7. The system as claimed in claim 6, wherein the first detection module further comprises a first estimating module configured to estimate a vector product of a vector of the measurement signals transmitted by the accelerometer and of a vector of the measurement signals transmitted by the magnetometer, and to detect a change of sign of the vector product.

8. The system as claimed in claim 7, wherein the first detection module further comprises a first calculation module configured to calculate a sum of squares of the components of a sum of the vector product and of a reference vector product estimated by the first estimating module at a reference instant, and the first detection module is configured to detect a change of orientation of the projection on a basis of a sum calculated by the first calculation module and of the first threshold, the vector products being normalized.

9. The system as claimed in claim 7, wherein the first detection module comprises a second calculation module configured to calculate an angular portion separating the vector product and a reference vector product estimated by the first estimating module at a reference instant, and the first detection means is further configured to detect a change of orientation of a projection on a basis of the angular portion calculated by the second calculation module and of a second threshold.

10. The system as claimed in claim 7, wherein the first detection module comprises a third calculation module configured to calculate a scalar product of the vector product and of a reference vector product estimated by the first estimating module at a reference instant, and the first detection means is further configured to detect a change of orientation of a projection on a basis of the scalar product calculated by the third calculation module and of a third threshold, the vector products being normalized.

11. The system as claimed in claim 6, wherein the first detection module comprises a second estimating module configured to estimate a quantity representative of an inclination of the magnetometer with respect to the horizontal plane on a basis of the measurements of the accelerometer, and a fourth calculation module configured to calculate a magnetic field compensated by applying to the measurements of the magnetic field, in the reference frame of the housing, a rotation inverse to that performed by the magnetometer.

12. The system as claimed in claim 11, wherein the second estimating module comprises a fifth calculation module configured to calculate a North-East-Down geographical reference frame at the reference instant in a reference frame of the magnetometer, a sixth calculation module configured to calculate a matrix for switching from the reference frame of the magnetometer to the North-East-Down reference frame, and a seventh calculation module configured to calculate angles of pitch and of roll of the magnetometer with respect to the reference frame of the magnetometer at the reference instant.

13. The system as claimed in claim 12, wherein the second estimating module comprises an eighth calculation module configured to calculate a sum of the squares of the components of a sum of a vector of the compensated measurements of the magnetometer and of a reference vector of the compensated measurements of the magnetometer at a reference instant, and the first detection module is further configured to detect a change of orientation of the projection on a basis of the sum calculated by the eighth calculation module and of the first threshold, the vectors being normalized.

14. The system as claimed in claim 12, wherein the first detection module comprises a ninth calculation module configured to calculate an angular portion separating a vector of the compensated measurements of the magnetometer and a reference vector of the compensated measurements of the magnetometer at a reference instant, and the first detection module is further configured to detect a change of orientation of the projection on a basis of the angular portion calculated by the ninth calculation module and of a second threshold.

15. The system as claimed in claim 12, wherein the first detection module comprises a tenth calculation module configured to calculate a scalar product of a vector of the compensated measurements of the magnetometer and of a reference vector of the compensated measurements of the magnetometer at a reference instant, and the first detection module is further configured to detect a change of orientation of the projection on a basis of the scalar product calculated by the tenth calculation module and of a third threshold, the vectors being normalized.

16. The system as claimed in claim 6, wherein the first detection module comprises a third estimating module configured to estimate an angle of yaw of the magnetometer with respect to the horizontal planar reference frame, on a basis of the measurements of the accelerometer and of the magnetometer.

17. The system as claimed in claim 4, wherein the first detection module comprises an eleventh calculation module configured to calculate a scalar product of a vector of the measurement signals transmitted by the magnetometer and of a vector of the measurement signals transmitted by the magnetometer at the reference instant, and the first detection module is further configured to detect a change of orientation of the projection on a basis of the scalar product calculated by the eleventh calculation module and of a fifth threshold, the vectors being normalized.

18. The system as claimed in claim 1, wherein the system is configured to count a number of changes of direction of a swimmer in a pool, wherein the housing is waterproof, and wherein a change of orientation corresponds to a change of direction of crossing of the pool.

19. The system as claimed in claim 18, further comprising a second detection module configured to detect a change of sign of an acceleration vector measured by the accelerometer representative of a change between a frontstroke and a backstroke of the swimmer.

20. The system as claimed in claim 19, wherein the second detection module comprises a twelfth calculation module configured to calculate a sum of the squares of the components of a sum of an acceleration vector measured by the accelerometer and of a reference acceleration vector measured by the accelerometer at a reference instant, and the second detection module further configured to detect a change between a frontstroke and a backstroke of the swimmer on a basis of the sum calculated by the twelfth calculation module and of a sixth threshold, the vectors being normalized.

21. The system as claimed in claim 19, wherein the second detection module comprises a thirteenth calculation module configured to calculate an angular portion separating the acceleration vector measured by the accelerometer and a reference acceleration vector measured by the accelerometer at a reference instant, and the second detection module is further configured to detect a change between a frontstroke and a backstroke of the swimmer on a basis of the angular portion calculated by the thirteenth calculation module and of a seventh threshold.

22. The system as claimed in claim 19, wherein the second detection module comprises a fourteenth calculation module configured to calculate a scalar product of the acceleration vector measured by the accelerometer and of a reference acceleration vector measured by the accelerometer at a reference instant, and the second detection module is further configured to detect a change between a frontstroke and a backstroke of the swimmer on a basis of the scalar product calculated by the fourteenth calculation module and of an eighth threshold, the vectors being normalized.

23. The system as claimed in claim 19, wherein the second detection module is further configured to update a fixed reference instant upon detection of a change between a frontstroke and a backstroke of the swimmer.

24. The system as claimed in claim 17, further comprising a third detection module configured to detect a change between a frontstroke and a backstroke of the swimmer when the scalar product calculated by the eleventh calculation module switches from a positive value to a negative value.

25. The system as claimed in claim 1, further comprising low-pass or average-based means of filtering over a sliding window.

26. A method of counting changes of direction of a person, comprising:
   using a magnetometer to measure a direction of a terrestrial magnetic field in a reference frame of a housing coupled to the person;
   determining a quantity representative of an inclination of the measured magnetic field with respect to vertical;
   detecting a change of orientation of an orthogonal projection of the direction of the terrestrial magnetic field in a horizontal planar reference frame having axes of constant directions and tied in translation to the person, on a basis of the measured direction of the magnetic field and of a quantity representative of an inclination of the magnetic field with respect to the vertical; and
   generating a signal representative of the change of orientation with respect to a reference orientation corresponding to a reference instant.

* * * * *